(12) United States Patent
Nutter et al.

(10) Patent No.: US 6,575,438 B2
(45) Date of Patent: Jun. 10, 2003

(54) STEPPED DOWNCOMER APPARATUS AND VAPOR-LIQUID CONTACT APPARATUS WITH SAME

(75) Inventors: Dale E. Nutter, Tulsa, OK (US); Mark W. Pilling, Jenks, OK (US); Christina J. Campbell, Tulsa, OK (US)

(73) Assignee: Sulzer Chemtech USA, Inc., Tulsa, OK (US)

( * ) Notice: Subject to any disclaimer, the term of this patent is extended or adjusted under 35 U.S.C. 154(b) by 0 days.

(21) Appl. No.: 09/878,909

(22) Filed: Jun. 13, 2001

(65) Prior Publication Data

US 2002/0190403 A1 Dec. 19, 2002

(51) Int. Cl.$^7$ .................................................. B01F 3/04
(52) U.S. Cl. ................................. 261/114.1; 261/114.5
(58) Field of Search ........................... 261/114.1, 114.5

(56) References Cited

U.S. PATENT DOCUMENTS

| | | | |
|---|---|---|---|
| 2,380,852 A | * 7/1945 | Lambert et al. | 261/114.5 |
| 2,420,075 A | 5/1947 | Glitsch | |
| 2,684,837 A | 7/1954 | North et al. | |
| 2,693,949 A | 11/1954 | Huggins | |
| 2,909,414 A | * 10/1959 | Gerhold et al. | 261/114.1 |
| 2,982,527 A | 5/1961 | Eld et al. | |
| 3,729,179 A | 4/1973 | Keller | |
| 3,747,905 A | 7/1973 | Nutter | |
| 3,784,175 A | 1/1974 | Hirao et al. | |
| 3,797,811 A | 3/1974 | Jullien et al. | |
| 4,101,610 A | 7/1978 | Kirkpatrick et al. | |
| 4,132,761 A | 1/1979 | Mix | |
| 4,504,426 A | 3/1985 | Chuang et al. | |
| 4,547,326 A | 10/1985 | Weiler | |
| 4,872,955 A | 10/1989 | Parker et al. | |
| 4,954,294 A | * 9/1990 | Bannon | 261/114.1 |
| 4,956,127 A | 9/1990 | Binkley et al. | |

(List continued on next page.)

FOREIGN PATENT DOCUMENTS

| | | |
|---|---|---|
| EP | 0 599 454 | 6/1994 |
| RU | 510247 | 5/1976 |
| RU | 546356 | 3/1977 |
| WO | 80/00418 | 3/1980 |
| WO | 98/32511 | 7/1998 |
| WO | WO 98/51390 | 11/1998 |
| WO | WO 01/24901 | 4/2001 |

OTHER PUBLICATIONS

"Linde Multiple Downcomer Trays," Product Brochure, Union Carbide Corp., P.O. Box 44, Tonawanda, N.Y. 14150, Nov. 1969.

"Packed Column Internals," Chen, Gilbert, *Chemical Engineering*, pp. 40–51, Mar. 5, 1984.

*Ballast Tray Design Manual*, Glitsch, Inc., Bulletin No. 4900—Fourth Edition, 1974.

"Diversity Process Strategies for Reformulated Gasoline," Nocca, Jean Luc, et al., *Hart's Fuel Reformulation*, vol. 4, No. 5, Sep./Oct. 1994.

*Primary Examiner*—C. Scott Bushey
(74) *Attorney, Agent, or Firm*—Smith, Gambrell & Russell, LLP

(57) ABSTRACT

A stepped downcomer with intermediate step platform and a step wall extending down. Extensions extend out from step wall ends toward the tower wall. A main panel extends from the interior edge of the platform up to the above positioned tray. The liquid-vapor mix flows into contact with the step platform and travels off the platform. The liquid also flows down along the extensions into contact with the inlet region of the lower tray, by-passing the platform. The lower edge of the step wall and lower edge of the extensions control fluid flow traveling under the lower edging from the inlet side of the downcomer apparatus to the active area of the tray. The relative level of the edges can be varied to suit use. The flow control region can additionally include baffles, slots, doors and other flow control devices.

58 Claims, 14 Drawing Sheets

U.S. PATENT DOCUMENTS

| | | |
|---|---|---|
| 5,106,556 A | 4/1992 | Binkley et al. |
| 5,164,125 A | 11/1992 | Binkley et al. |
| 5,192,466 A | 3/1993 | Binkley |
| 5,213,719 A | 5/1993 | Chuang |
| 5,277,848 A | 1/1994 | Binkley et al. |
| 5,360,583 A | 11/1994 | Nutter |
| 5,453,222 A | 9/1995 | Lee et al. |
| 5,454,989 A | 10/1995 | Nutter |
| 5,468,425 A | 11/1995 | Nutter |
| 5,480,595 A | 1/1996 | Yeoman et al. |
| 5,632,935 A | 5/1997 | Yeoman et al. |
| 5,702,647 A | 12/1997 | Lee et al. |
| 5,762,668 A | 6/1998 | Lee et al. |
| 5,788,894 A | 8/1998 | Yeoman et al. |
| 5,895,608 A | 4/1999 | Lee et al. |
| 5,948,211 A | 9/1999 | Yeoman et al. |
| 5,951,827 A | 9/1999 | Breedon |
| 5,975,504 A | 11/1999 | Nutter et al. |
| 6,003,847 A | 12/1999 | Lee et al. |
| 6,053,484 A | 4/2000 | Fan et al. |
| 6,076,813 A | 6/2000 | Yeoman et al. |
| 6,224,043 B1 * | 5/2001 | Fan et al. ................. 261/114.5 |
| 6,250,611 B1 * | 6/2001 | Pilling et al. ............. 261/114.1 |
| 6,287,367 B1 * | 9/2001 | Buchanan et al. ........ 261/114.5 |

* cited by examiner

FIG. 12
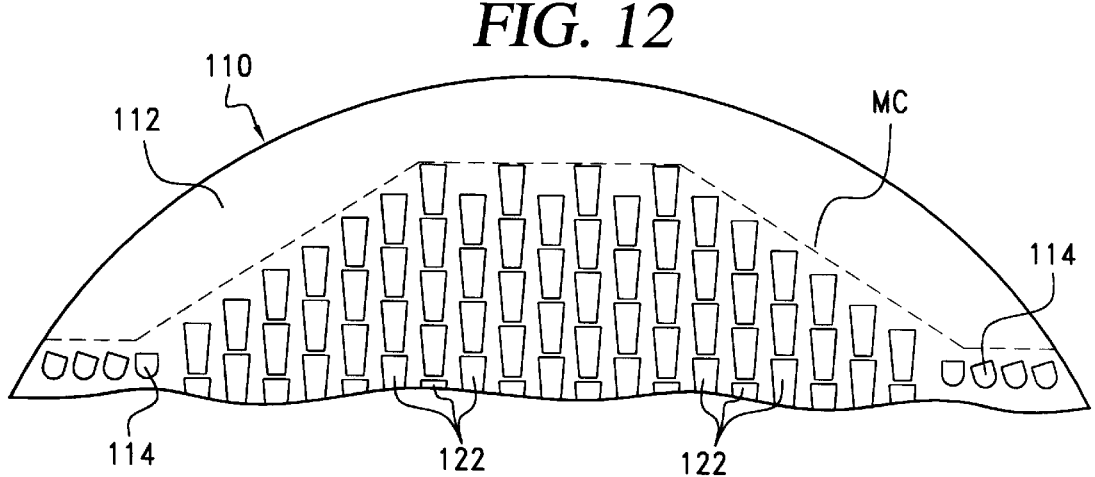
FIG. 13
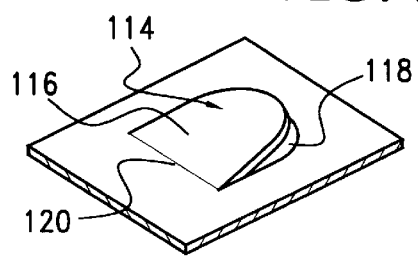
FIG. 14
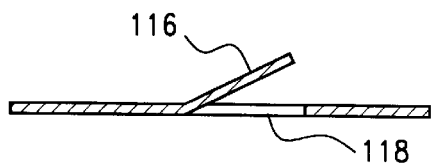
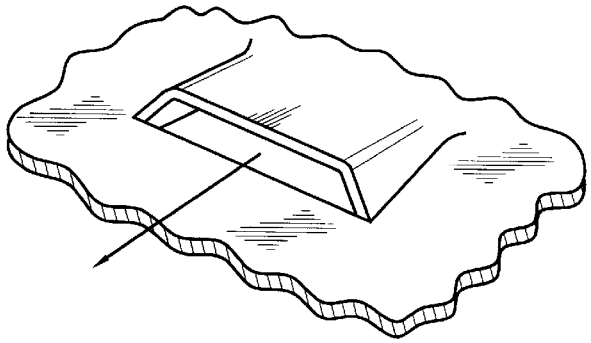
FIG. 16
FIG. 15
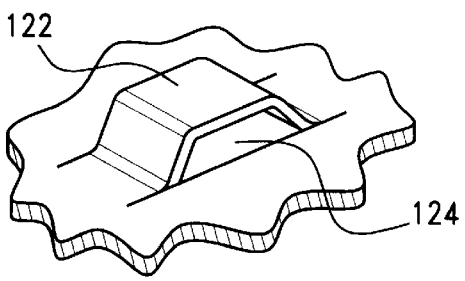

STEPPED DOWNCOMER APPARATUS AND VAPOR-LIQUID CONTACT APPARATUS WITH SAME

FIELD OF THE INVENTION

This invention relates to a downcomer apparatus and to a vapor-liquid contact apparatus provided with the downcomer apparatus, and preferably to a chemical processing vapor-liquid contact apparatus in which a vessel contains a plurality of substantially horizontal trays which support a vapor-liquid mixture. Liquid is introduced at the upper end of the vessel and it flows down from tray-to-tray, via a plurality of stepped downcomer apparatus, and the trays are apertured to provide bubbling areas through which ascending vapors can rise to contact liquid and/or vapor-liquid mixtures which are supported on and flowing across the trays.

BACKGROUND OF THE INVENTION

It has been recognized in the art that the performance of a contact tray apparatus can be enhanced if the liquid flow on the tray is uniform in the respect that the flow in the lateral areas of the tray is substantially the same as the flow along the central flow axis thereof. Heretofore, shaped downcomer tips, directional vapor outlets and other means have been utilized for this purpose.

It has also been recognized in the art that the performance of a contact tray apparatus can be enhanced in some situations if the inside wall of the downcomer is sloped from vertical in order to create a decreasing downcomer cross-sectional area from the top to bottom. This design effectively maximizes the downcomer inlet opening and minimizes the area occupied by the bottom of the downcomer, thus maximizing the bubbling area for additional vapor flow. As a downcomer on the side portion of a tray is sloped to decrease the cross-sectional area, the length of the chordal liquid release decreases proportionally. Typically, the degree of downcomer sloping is often limited in order to maintain a chordal liquid release length no less than 60% of the tower diameter in order to ensure adequate liquid distribution onto the tray.

There has also been utilized in the art truncated downcomers which are trough like and contain an integral floor that is elevated above the deck of the tray below and extends outward from a supporting downcomer wall. The truncated downcomer floor has apertures designed to control the liquid flow to the tray below and also forms a liquid seal to prevent vapors from flowing upward through the downcomer. The liquid release from a truncated downcomer is vertically downward as opposed to a conventional downcomer which releases the liquid horizontally onto the tray as a moving fluid body past a vertical spacing defined by a downcomer lower edge. The elevated apertured floors of a truncated downcomer are designed to physically separate the downcomer from the tray deck in order to allow the deck area underneath the downcomer to be perforated for vapor flow thus increasing the effective bubbling area of the tray. The elevated apertured floor also provides a downcomer discharge location separate from the hydraulic head and turbulence of the frothy mixture on the tray below. However truncated downcomer designs have some inherent limitations. The design requires a dynamic seal where the pressure drop of the liquid leaving the floor apertures prevents vapor from flowing up the downcomer from the tray below adversely affecting the tray performance. The truncated downcomer, by definition, shortens the vertical downcomer length. With some liquid/gas mixtures, the truncated design may not provide sufficient downcomer length causing the fluid in the downcomer to back up onto the tray above, thus limiting the tray capacity. The floor orifices in truncated downcomers are susceptible to plugging from particulate matter in systems where solids are present in the operating fluids. Also, the downward release of liquid from the apertured floor tends to cause the liquid to be released unevenly onto the tray deck below.

When the target area of an element of liquid downflow from a truncated downcomer is near an obstruction such as the inner wall of a vessel, the liquid capillary wave celerity emanating radially from the liquid impact point in the target area will strike and rebound from the vessel wall. Due to the concave curvature of the wall of a cylindrical vessel, some of the rebounding capillary wave liquid will be directed toward the central flow axis of the tray, thus causing a focusing effect which results in a higher flow rate at the central flow axis of the tray than at the sides thereof. This effect creates a liquid peak at the central flow axis and causes liquid recirculation eddy tendencies along the sides of the central flow. Both of these occurrences tend to reduce tray mass transfer efficiency and decrease the effective capacity of the tray. Heretofore, specialized floor orifice patterns and directional vapor outlets on the tray decks other means have been utilized to mitigate this effect.

U.S. Pat. No. 6,003,847 describes a prior art downcomer embodiment that utilizes a downcomer with a highly sloped, semi-conical wall with an outlet formed by a lower edge of the semi-conical wall and the inner surface of the tower wall to control the release of the liquid traveling between that lower edge and the tower wall which liquid then travels down to the tray below. The outlet opening defined by the lower edge of the semi-conical wall and tower wall has a central outlet portion and outer outlet portions with the outer portions increased in size as compared to the center portion. This arrangement is described as providing more liquid flow through the opposing end portions than through the center of the downcomer outlet and also is indicated as being considered to provide a more uniform flow across the tray. In conjunction with the above noted outlet opening, U.S. Pat. No. 6,003,847 describes the use of a multi-chordal inlet weir offset horizontally inward on the tray receiving liquid from the flow controlling semi-conical outlet above to control the liquid flow traveling out onto the tray deck. From this device, the volumetric flow will be proportional to the length of the slot or inlet weir. The concave weir, by definition, releases a disproportionate amount of liquid to the center of the flow path and also directs the liquid towards a focal point located on the flow path centerline, thus creating uneven liquid distribution on the tray deck. Heretofore, devices of this type have used directional vapor apertures on the tray deck to redistribute the liquid. However, these devices have only limited effectiveness within a limited range of equipment operation.

Also in prior art, sloped or small downcomer tray designs in large diameters may often do not have sufficient mechanical strength and require separate trusses or beams that would likely impede the flow of the gas-liquid mixture on the tray deck and limit capacity.

SUMMARY OF THE INVENTION

Under the present invention, a downcomer is provided that is designed to maximize the active bubbling area available and maintain the maximum downcomer length available for separation of the vapor-liquid mixture in the downcomer, while also providing uniform liquid flow distribution at the inlet edge of the active bubbling area. The downcomer of the present invention is also designed to enhance tray and downcomer structural support.

By providing a more uniform liquid flow distribution at the inlet edge of the active bubbling area, the present invention is also directed at avoiding the aforementioned problem of having the liquid flow non-uniform due to a greater amount of centralized flow and recirculation eddy tendencies along the sides of the central flow.

Thus, according to the present invention, the flow of fluid into the bubbling area of a tray is made more uniform across the width of the bubbling area by providing a novel shape and location of a liquid passageway defined by a downcomer outlet which feeds liquid evenly onto the tray. In a preferred embodiment, for example, a downcomer is provided that has a unique chordal shape and means for controlling the vertical column height of liquid flow traveling between the downcomer lower edge and tray below, which arrangement helps avoid the problem of having the liquid flow non-uniform due to a greater amount of centralized flow and recirculation eddy tendencies along the sides of the central flow. The design of the present invention is therefore directed toward providing increased capacity, higher efficiency, a greater operating range as well as minimization of the risk of fouling or plugging of holes or other smaller multiple openings at the downcomer outlet. The design also improves structural support efficiency. Furthermore, by providing for easy adjustability of the components which define the novel downcomer outlet opening, the apparatus can be adjusted upon installation to accommodate tower out-of-roundness and assure symmetrical liquid outflow to achieve optimum performance.

The mechanical design of this invention allows for a stronger, simpler, and less intrusive support structure for the tray above. This is especially important with larger diameter designs with moderate to low tray spacings.

The present invention is also directed at avoiding the performance degrading effect of the downcomer focusing liquid towards the liquid flow path centerline through use of a stepped downcomer with an elongated multi-chordal downcomer outlet opening featuring a continuous slot or slots directing liquid flow parallel to the tray central flow axis, with a maximum effective chordal downcomer escape length.

This invention is thus based in part on the recognition that there are inherent deficiencies in the liquid distribution at the upstream portion of the bubbling areas of the trays in the apparatus described in the prior art, particularly due to the configurations and arrangements of the apertures in the truncated downcomer floors, in the configuration of continuous arcuate slots and weirs, and in the arrangement and other design features of the prior art downcomers. The configuration of the present invention features a step downcomer that provides a side downcomer escape with the maximum chordal downcomer escape length spacing which can be designed to properly proportion the liquid flow evenly onto the tray bubbling area. The configuration of the present invention further provides the maximum potential bubbling area while distributing liquid evenly onto the bubbling area in a direction parallel to the central flow axis to resist retrograde flow. The design of the present invention is also such that the downcomer features open areas at the radial outward step area and the opposing ends of the horizontal portion of the step of the downcomer which permit additional liquid downflow at the ends of the downcomer's cross-sectional area. In a preferred embodiment, these openings extend to the tower wall; therefore, troublesome horizontal downcomer-to-tower wall attachments used with conventional stepped downcomers are not needed thus reducing design and installation complexity.

In addition, the downcomer design of the present invention includes a step section replacing the lower portion of a vertical chordal downcomer. The stepped section of the downcomer of the present invention preferably includes a step wall arrangement that has a major vertical component and extends in a downward direction (i.e., directly vertically down or in an oblique relationship to a vertical plane) from an outer periphery of the generally horizontal downcomer step panel. In a preferred arrangement the downcomer step wall features a plurality of wall panels that are preferably integral or bolted together and, when combined with the vertical chordal downcomer panel above the step platform, define a radial inward wall region in the downcomer that is free of holes or apertures. The opposing end panels of the multi-panel step wall are hereafter referred to as tiplets. The tiplets enclose the end portions of the downcomer step openings which are radially external such that the panels prevent vapor bypassing into the downcomer. The tiplets are positioned to re-direct the additional liquid within the downcomer towards the ends of the downcomer escape. For many usages of the present invention the tiplets are vertical. For high pressure or other cases requiring a greater difference in the downcomer cross-sectional area at the top and bottom, the tiplets can be inclined radially outward at the bottom to reduce the enclosed area at the bottom of the downcomer. For some embodiments, particularly larger diameter towers, it is helpful to have chordal extensions that extend out from respective vertical edge end regions of the tiplets (opposite the vertical edge end region of the tiplets to which the central chordal wall panel is attached) toward the tower wall and into a supporting relationship therewith.

An additional preferred feature of the present invention is that, at the weir, the vertical upper downcomer truss panel supports the downstream ends of a tray deck panel arrangement. Also, for small columns the tiplets and central chordal step wall panel can be integrated into one piece and will not require a separate set of clamping bars for attachment to the tower. That is, rather than a separate set of clamping bars, the entire set of step wall panels are supported by the top downcomer chordal panel that forms the major vertical supporting truss.

For large columns with low tray spacings, relatively short, vertical support members such as vertical channel members, preferably oriented parallel to the central flow axis, or tiplet extensions extending down to the tray below can be added to support the truss panels from the deck trusses on the tray below.

The lower edge of the tiplets, the central chordal step wall panel, and the extensions extending out from the interior of the tiplets and preferably into engagement with corresponding tower wall supports, provide the means for controlling the vertical liquid flow through column height with respect to the underlying tray. The spacing between the lower edge of each of these components of the stepped downcomer can also be adjusted either in unison or relative to each other to achieve a desired spacing between the lower downcomer panel edges and the tray below. The portions of horizontal cross-sectional outlet areas provided at the center and extremities at the bottom of the downcomer can be independently adjusted to provide optimum liquid flow distribution as such modifications alter the position of the lower edge of one or more of the aforementioned lower edges and hence the location of where the vertical flow controlling downcomer edge is located relative to the tray below. With respect to truncated downcomers where the horizontal cross sectional opening is controlling and not the vertical flow through spacing, larger areas at the extremities at the bottom of the downcomer have been found to be beneficial in truncated downcomer configuration testing. In this regard, reference is made to copending U.S. application Ser. No. 09/413,885 filed on Oct. 7, 1999 (now U.S. Pat. No. 6,250, 611) featuring a floor platform which provides desirable downcomer flow through liquid handling capacity attributes. The peripheral location and configuration of the step platform can also be set, such that either though use of vertical wall panels alone or in conjunction with sloping tiplets, for example, a desired liquid vertical flow through passageway and liquid handling arrangement can be achieved. Other liquid handling features like sweepback weirs at the top of segmental side downcomers can be used to further enhance downcomer liquid handling capacity.

According to one principal feature of the present invention, a vapor-liquid contact apparatus comprises a vessel, and a plurality of vertically spaced horizontal trays in the vessel for supporting a vapor-liquid mixture. Each of the trays has a bubbling area, a liquid infeed area at an upstream end of the bubbling area, and an exit opening at a downstream end of the bubbling area. The bubbling area has a central flow axis which leads from the liquid infeed area to the exit opening, and apertures which permit ascending vapors to flow up through the tray and into a vapor-liquid mixture on the tray. A downcomer is provided for receiving the vapor-liquid mixture from the exit of the tray above and for carrying and uniformly distributing liquid to the tray below. The downcomer has an upper portion with a cross-section which is surrounded by an inner edge and a concave outer edge. These edges are perpendicular with respect to the central flow axis (e.g., perpendicular to the preferably straight lined inner edge and perpendicular to the tangent of the concave outer edge at the central flow axis). The cross-section of the downcomer has a centerline which is the same as the central flow axis of the bubbling area. A step is provided in the above-mentioned cross-section and at an intermediate elevation of the downcomer's vertical height to reduce the size of the downcomer cross-sectional area adjacent to the bubbling area.

From the outer periphery of the intermediate step there extends downwardly a step wall extending from, and conforming in shape (at least generally) to, the radially outer peripheral edge of the step. The downcomer step wall defines the cross-sectional area of the bottom portion of the downcomer. The opposing ends of the step wall are referred to as tiplets. The lower or bottom edge of the step wall preferably has a cross sectional configuration with a shape common to that of the upper region either positioned at a common radial position (e.g., vertical tiplets defining similar opening spacing between the upper and lower regions of the tiplet portions with respect to the radially outward positioned concave outer edge of the downcomer) or at an oblique orientation wherein, from the step level downward, the bottom of the downcomer has decreasing horizontal, cross-sectional areas). For instance, outwardly sloping tiplets (preferably generally conforming in shape to the upper edge portion except for the sloping) are provided that are sloped radially outward in their vertical extension to the lower edge of the tiplet regions. In this way, there is a decrease in the area of the downcomer cross-sectional passageway going from the intermediate step down to the downcomer's lower edge.

From a horizontal cross-section standpoint, the downcomer outlet opening is comprised of an elongated downcomer outlet slot or series of slot sections, the width being perpendicular to the lower edge of the lower downcomer step wall panels and the length being parallel with respect to the lower edge of the lower downcomer step wall panels. The slot width at the centerline of the horizontal cross-section at the level of the outlet opening is preferably no greater than the slot width at locations which are spaced from the centerline.

Also, by providing the desired initial chordal length for the central panel and the desired angle in the tiplets (in their extension from the central choral panel out into contact with the extensions extending out into a support relationship with the tower), the relative width of the extensions (preferably chordal extensions extending parallel with the central step wall panel), can be set to achieve high performance in vapor-liquid contact across the tray. In addition to the central chordal panel's lower edge extending perpendicular to the central flow axis, the two extensions extending from the tiplets also present lower edges that are perpendicular to the central flow axis and the length of that lower edging can be set to take advantage of the relatively large volume of liquid flow traveling to opposite sides of the step platform and down the tiplets. This achieves a desirable high flow volume in a direction parallel to the central flow axis so as to avoid the problem of having the liquid flow non-uniform due to a greater amount of centralized flow and recirculation eddy tendencies along the sides of the central flow. The relative percentage of the length of downcomer exit edging extending perpendicular to the central flow axis and that which forms the tiplets and is obliquely arranged to the flow axis (and which determines or generally determines the step platform's configuration), can be readily set under the design of the present invention to best accommodate the intended use of the downcomer. Having a large percentage of lower downcomer exit edging extending perpendicular to the central flow axis also enhances the versatility of the type of vapor aperture valves that can be utilized in the trays. For example, vapor aperture valves having valves with side gas outlets and blocked upstream and downstream ends can be used in these areas with little concern for liquid introduction into the side outlets.

According to another main feature of the invention, a vapor-liquid contact apparatus comprises a vessel, and a plurality of vertically spaced horizontal trays in the vessel for supporting a vapor-liquid mixture. Each of the trays has a bubbling area, a liquid infeed area at an upstream end of the bubbling area, and an exit opening at a downstream end of the bubbling area. The bubbling area has a central flow axis which leads from the liquid infeed area to the exit opening, and apertures which permit ascending vapors to flow up through the tray and into a vapor-liquid mixture on the tray. A downcomer is provided for receiving the vapor-liquid mixture from the tray and for carrying liquid to another tray. The downcomer has an upper portion located at the exit opening of the tray. This upper portion defines an upper opening of the downcomer with respect to a horizontal cross-section that preferably features a straight line inner boundary and a preferably concave radially outer boundary. The downcomer also has an intermediate height region that includes an intermediate generally horizontal step platform having an inner straight edge parallel to and on a common vertical plane with the inner boundary chordal edge of the top of the downcomer opening and an outer chordal edge that, in conjunction with the outward concave boundary of the downcomer, defines a cross-sectional opening region. The chordal sides of the generally horizontal step platform are symmetrically truncated and shorter than the full downcomer chord length providing two end opening regions. Extending downwardly from the step platform symmetrically at each end is a tiplet portion which, along with the other step wall panel(s) define a lower region of the downcomer. The cross-section of the downcomer (including that for the upper portion, intermediate step portion and lower tiplet portion) has a centerline which is identical to the central flow axis of the bubbling area. The step portion is provided within the confines of a vertical extension of the above-mentioned cross-section to decrease the cross-sectional area of the bottom portion of the downcomer. The step platform has symmetrical outer edges which are spaced from the outer boundary edge of the cross-section of the downcomer to form a step defined bottom downcomer cross-section leading to a downcomer passageway defined in part by step wall portions of the downcomer. The configuration of the symmetrical stepwall panels of the bottom downcomer section at an elevation at or below the level of the step platform is preferably radially inwardly defined by the step platform's outer edge (the step platform preferably has a central truncated chordal edge and two symmetrical outer end edges in conjunction with the downcomer's outermost boundary). The two opposite end edges extend divergently outward from opposite ends of the step platform's central edge and radially inward to the step platform's inner most edge which coincides with the innermost boundary of the downcomer's upper portion.

In larger trays, the vertical chordal step wall panel that encloses the lower central portion of the downcomer extends and is attached to the concave outer edge defining the downcomer's outermost boundary, which in large trays is the tower's interior, to efficiently add additional mechanical support. In connection with the foregoing features, the preferred embodiment of the invention also includes a multi-paneled wall extending below the downcomer step area which has a central chordal panel extending vertically downward from the central edge of the step platform and is located between the tiplet sections of the step wall. In large towers, this central panel in the step wall section is extended in length (either as a monolithic panel or by way of added extensions) and attached to the outermost boundary of the downcomer, which in a preferred embodiment is the tower's interior, to provide additional mechanical support.

In the preferred embodiment, the lower downcomer cross-section has a central region defined by the central chordal panel of the step wall and the outermost boundary of the downcomer and has side regions defined by the tiplets of the step wall and the outermost boundary the downcomer. Each of these regions has a central region that is radially wider at or below the step platform plane than the outlet region extremities due to the concave shape of the outer downcomer boundary wall. These three areas combine to form the total cross-sectional area of the lower downcomer. The lower downcomer area at the bottom downcomer cross-section, has a total area no greater than 70% of the area of the top downcomer cross-section. The average radial distance between the central panel of the step wall and the outermost boundary of the downcomer is preferably no more than about 60% of the maximum transverse distance between the top downcomer inside wall and the outermost boundary of the downcomer.

The downcomer outlet opening comprises a continuous slot or series of slots formed by the vertical spacing between the lower edge of the downcomer step wall panels and the deck of the tray below, the width being perpendicular to the lower edge of the step wall panels and the length being parallel with respect to the lower edge of the step wall panels. A preferred outlet slot configuration has the slot locations restricted to the area formed by the gap between the step wall panels that are perpendicular to the central liquid flow axis and the deck of the tray below or between flow directing baffles below the tiplets and above the tray below in order to ensure that all liquid is released parallel to the central liquid flow axis. These flow directing baffles can be located and aligned with trusses in the tray below to also provide additional downcomer support in large vessels.

A preferred downcomer outlet slot opening has a chordal length as measured from the extreme opposite ends of the lower composite wall, which is at least 60% of the tower diameter. The downcomer outlet slot opening preferably extends along at least 40% of the full multi-chordal length of the downcomer step wall A preferred embodiment of the invention utilizes a tray provided with strategically located directional jet tabs or push valves which are located and oriented in the active bubbling area to utilize the momentum of the vapor flow from the active bubbling area to accelerate movement of liquid from the liquid infeed area as necessary to provide uniform liquid flow onto and across the width of the bubbling area. Each of these directional apertures include an opening in the tray and a deflector for directing vapors ascending through the opening in a direction away from the liquid infeed area. The directional apertures have a spacing density which is less in areas near the central flow axis than in areas which are laterally spaced from the central flow axis. In a preferred embodiment of the invention, stationary deflectors are located above each of the tray apertures in the bubbling area. These deflectors have upstream and downstream ends connected to the tray so that vapors ascending through the tray apertures are introduced laterally into liquid in the bubbling area.

Preferably, the immediate liquid infeed area is substantially devoid of apertures to prevent ascending vapors from affecting the flow in a preceding downcomer of a tray thereabove and to prevent liquid in the preceding downcomer from weeping through the liquid infeed area. Since the downcomer configuration of this invention provides more effective liquid distribution to the active bubbling area than the prior art, it can be used with sieve tray decks with simple perforated active bubbling areas.

The chordal inner wall of the downcomer preferably has chordal extensions extending out into direct contact with, and attached to, vertical clamping bars at each end that are welded to the interior wall of the tower. The vertical portion of this chordal inner wall above the step platform has a channel beam form and principally supports the downcomer and the outlet end of the tray panels. The inner wall of the downcomer also includes vertical, intermediate wall sections that represent the extensions extending inward from contact with the tower at opposite chordal ends into the outer vertical side edging of the tiplets. The radially outer positioned tiplet panels are attached to the central vertical chordal panel of the step wall which, as noted above is preferably attached to vertical clamping bars at each end that are welded to the interior wall of the tower. Particularly for larger sized towers or vessels, there is further provided wing or chordal extensions (e.g., integral extremities of the central vertical chordal panel of the step outside the tiplet panels) that extend out into supportive relationship with the tower wall. The wing extensions are provided with liquid level equalization apertures. Extending inward from the step wall and forming the step platform are one or more horizontal panels that are supported by the chordal inner wall of the downcomer and/or the vertical panels of the step wall. Each downcomer, on a common tower side, is also preferably similarly situated (e.g., vertical tiplets falling along a common vertical plane, although different tiplet positioning potential is a very useful design feature of the present invention that permits different downcomer proportionment to adjust for liquid and vapor flow rates and physical properties along the vertical length of the tower).

In an embodiment of the invention, the downcomer step has an outer periphery that is defined by a plurality of linear sections, with three linear sections being the most preferred.

BRIEF DESCRIPTION OF THE DRAWINGS

FIG. 12 is a plan view of a tray section with vapor aperture valves and jets.

FIG. 13 is a perspective view of a jet which is used in the embodiment of FIG. 12.

FIG. 14 is a sectional view of a jet which is used in the embodiment of FIG. 12.

FIG. 15 is a perspective view of a vapor aperture and deflector utilized in the embodiment of FIG. 12.

FIG. 16 is a perspective view of an alternate embodiment of vapor aperture and deflector suited for use in the present invention.

DESCRIPTION OF PREFERRED EMBODIMENTS

Figure 1:
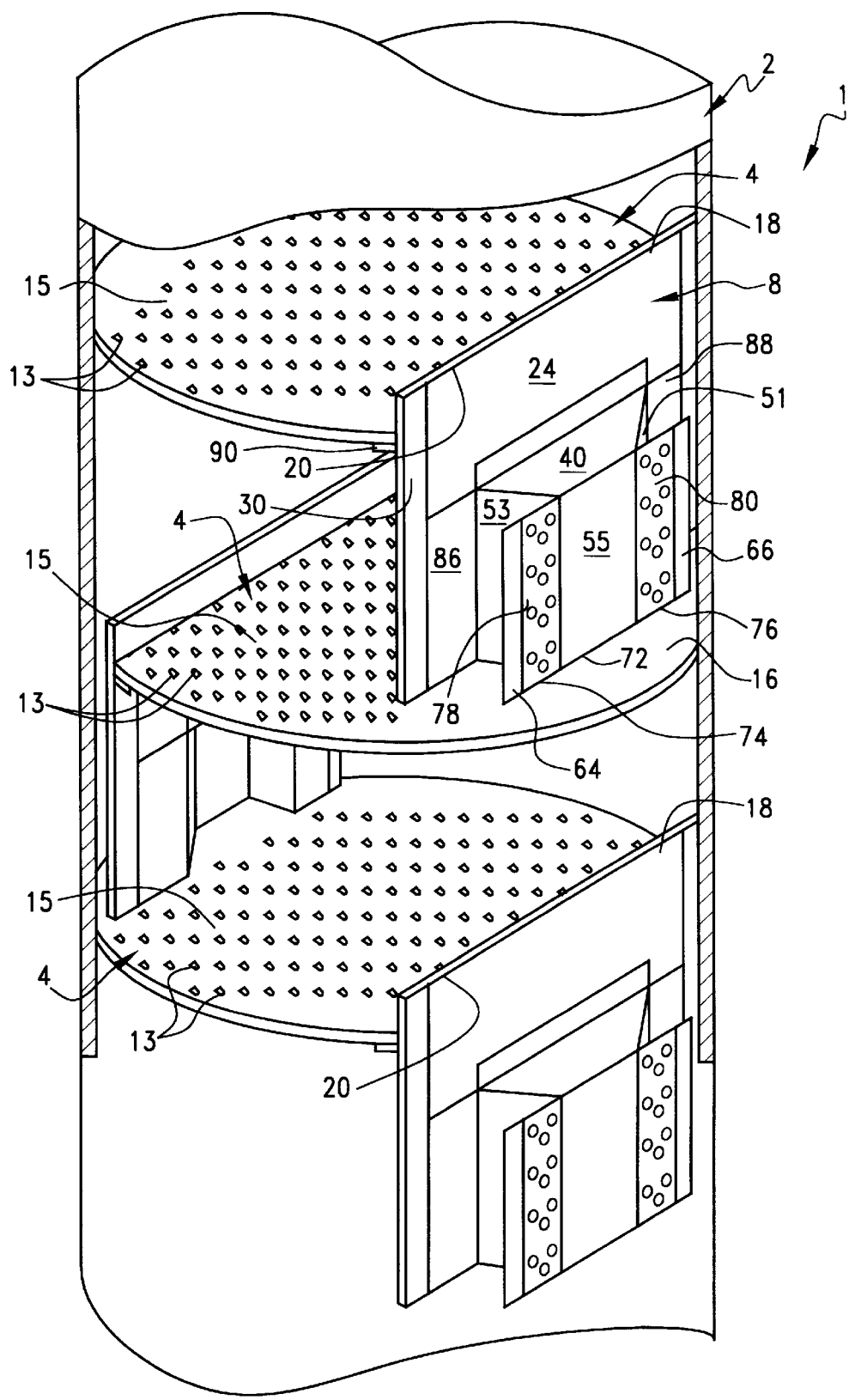
FIG. 1 is a diagrammatic perspective view of a vapor-liquid contact apparatus with a stepped downcomer apparatus according to the invention.
Figure 2:
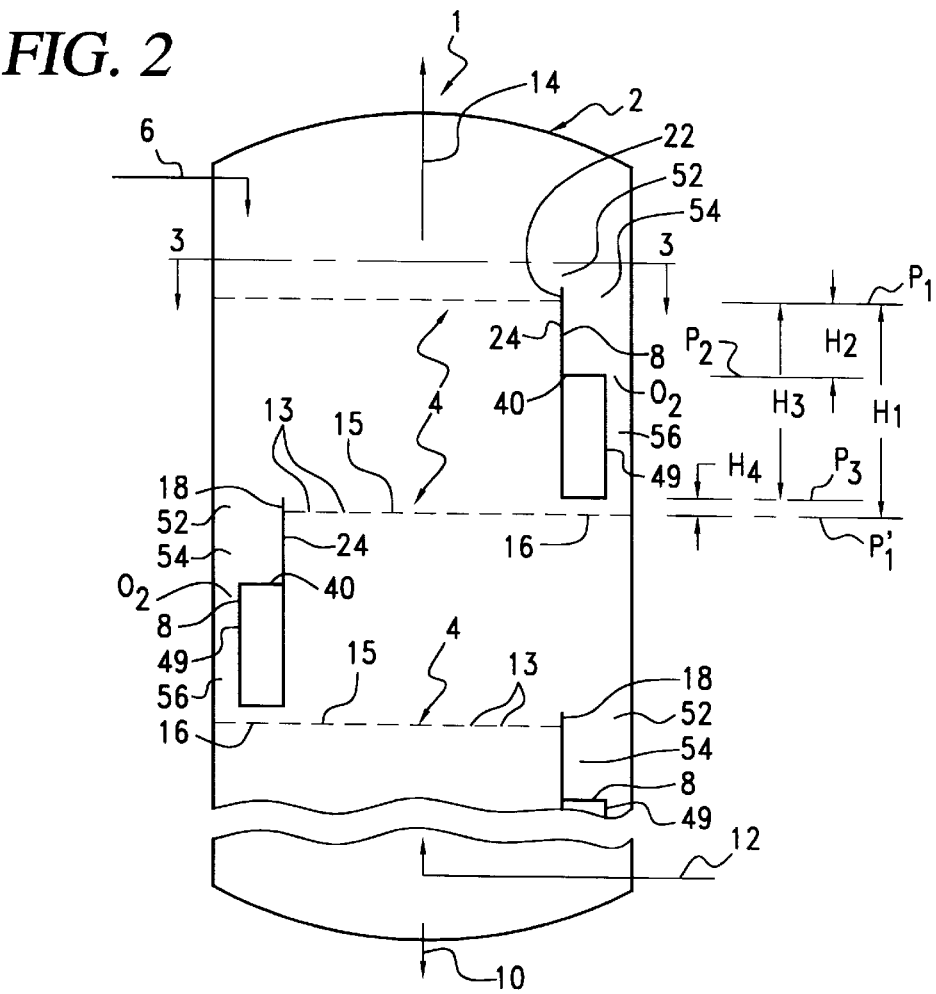
FIG. 2 is a diagrammatic sectional view of the apparatus, taken in the vertical plane of the tray central flow axis.
Figure 6:
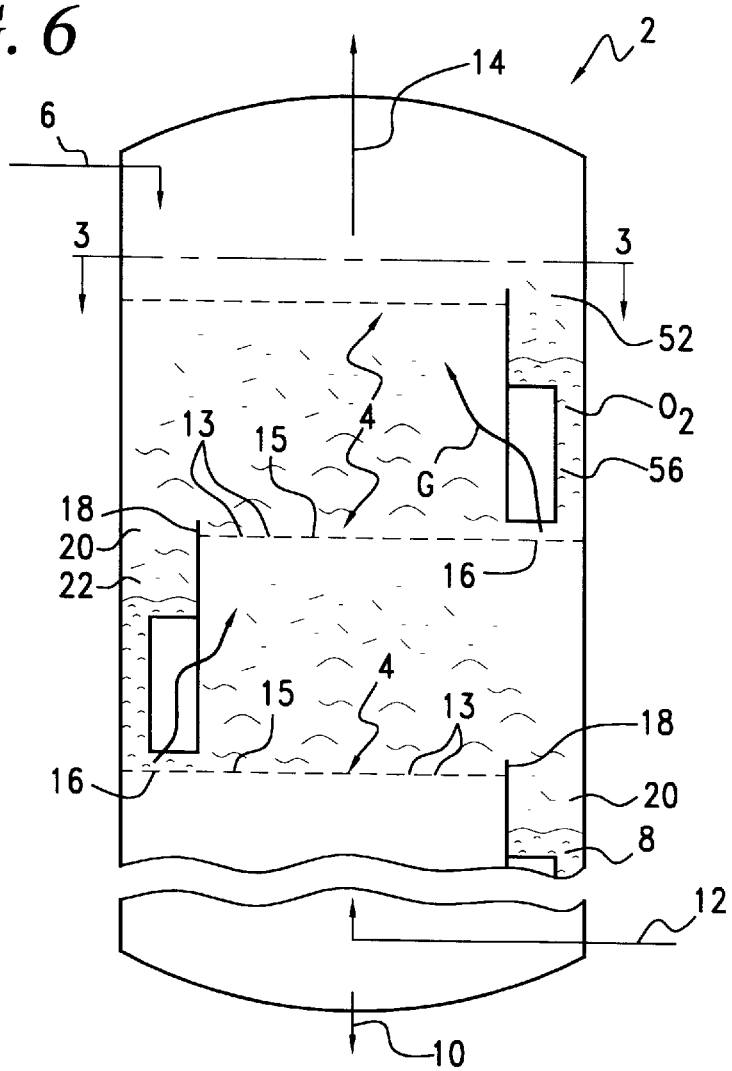
FIG. 6 is a view similar to FIG. 2 but with an added rough schematic illustration of a liquid and gas flow through the apparatus.

FIGS. 1 to 4B illustrate a first embodiment of a vapor-liquid contact apparatus with stepped downcomer apparatus. As shown in FIGS. 1 and 2, in particular, vapor-liquid contact apparatus 1 includes vessel 2 containing a plurality of vertically spaced horizontal contact trays 4 for supporting a vapor-liquid mixture. Liquid is introduced to the uppermost tray in the vessel by a supply line 6 (FIG. 2), it flows horizontally across the trays 4, (and) vertically (and horizontally again via a step as described below) though stepped downcomer apparatus 8, and then horizontally along the inlet portion of the tray and below a vertical opening defined between the lower edge of the downcomer and tray below. This is repeated until the liquid is discharged from the vessel by a liquid outlet line 10. The central flow axis of the vapor-liquid mixture across a tray is identified by the reference numeral 11 in FIG. 3A. As shown by FIGS. 2 and 6, for instance, air or another gas applicable to the process is introduced into the vessel by a supply line 12 and moves upwardly through apertures 13 in the trays 4 where it mixes with the liquid supported on the trays to form a vapor-liquid mixture, and it exits the vessel via a gas discharge line 14.

Each tray 4 has an active bubbling area 15, an immediate infeed area 16 at an upstream end of the bubbling area, and preferably a weir 18 which leads to an upper exit opening region 20, defined by the top of the downcomer apparatus 8, at the downstream end of the bubbling area. The apertures 13 in the bubbling area permit ascending vapors to flow up through the tray and into the vapor-liquid mixture on the tray. Preferably, the tray is substantially devoid of apertures in the immediate infeed area 16 so vapors ascending from the apertures will not affect the incoming flow from the overlying downcomer, and liquid from the overlying downcomer will not weep through the infeed area. In addition to enhancing the flow pattern across the tray, the present invention is also directed at providing an increased aperture region across the tray by lessening the amount of non-apertured tray areas, together with an improved gas flow in the aperture area extending up to the non-apertured region. Each tray may be formed of multiple interconnected panels or as a monolithic sheet, depending mainly on the tower diameter.

Figure 3A:
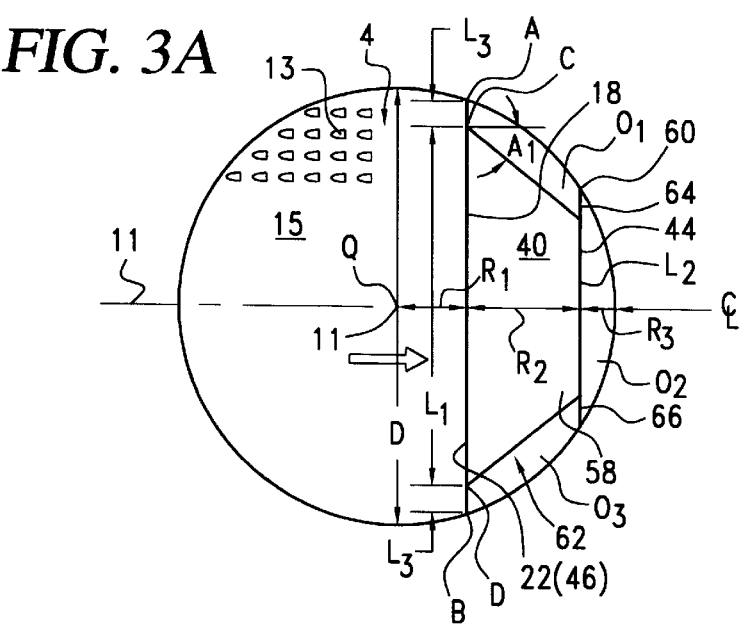
FIG. 3A is a diagrammatic sectional view of the apparatus, looking downwardly along the section line 3—3 of FIG. 2 (with only some of the gas apertures shown for draftsperson's convenience).
Figure 4A:
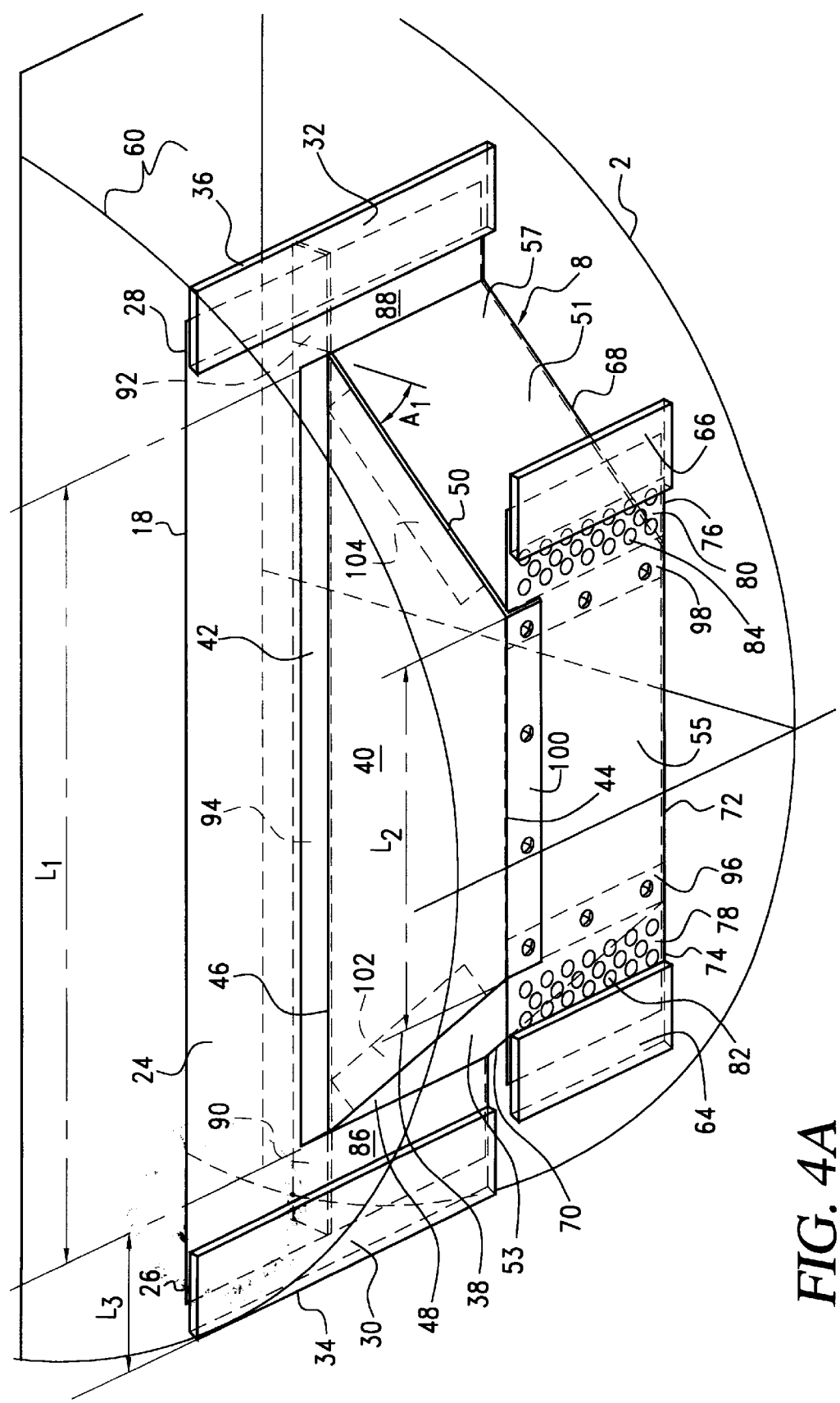
FIG. 4A is a three dimensional, perspective line drawing of a preferred embodiment of the stepped downcomer apparatus of the present invention with its tower support bars.
Figure 4B:
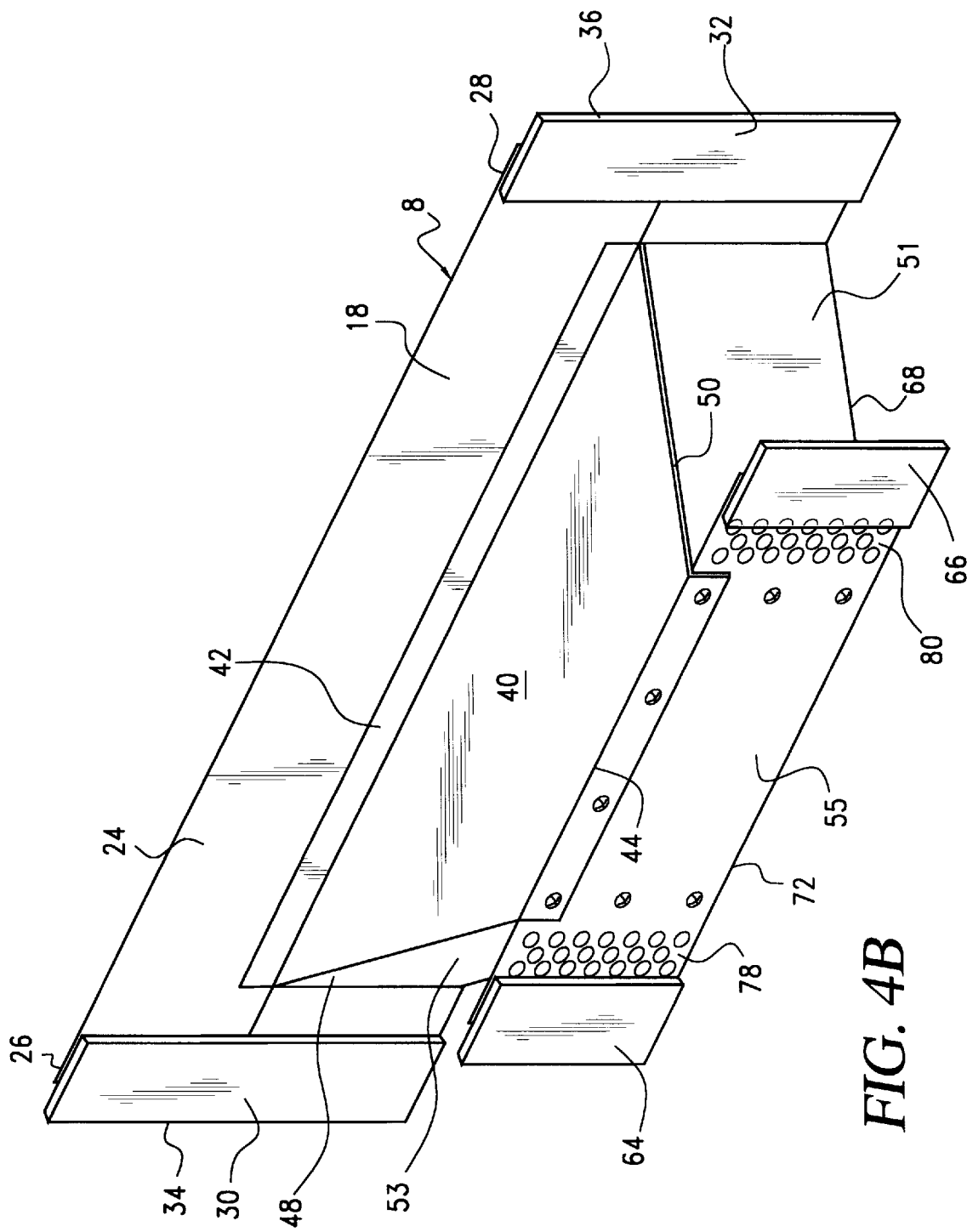
FIG. 4B is a three dimensional solid depiction of the stepped downcomer apparatus shown in FIG. 4A.

With reference to FIGS. 1, 3A, 4A and 4B, stepped downcomer apparatus 8 features, in the illustrated embodiment, top downcomer panel and weir combination 18 extending (in a vertical plane in this instance) upward at the downstream end 22 of active bubbling area 15 (see FIG. 2). The top downcomer panel and weir combination 18 is represented in FIGS. 4A and 4B by upper rectangular plate 24 having ends 26 and 28 secured to support bars 30 and 32, respectively. Plate 24 is the principal supporting member for stepped downcomer apparatus 8 and the downstream end of the active bubbling area panels forming tray 4. In a preferred embodiment, support bars 30 and 32 are elongated vertical support plates having a vertical length greater than that of the plate's 24 vertical length. Support bars 30 and 32 have outer edges 34 and 36 that are secured to the interior surface of the tower by, for example, a direct weld. Alternatively, the support panels 30 and 32 can be indirectly connected to the radial outer boundary wall of an envelope type downcomer (see FIG. 11, for example) not relying on the tower wall as its outer wall, or form an intermediate opposite end support for the concave outer wall of the envelope downcomer.

FIGS. 4A and 4B illustrate a preferred embodiment of the stepped downcomer apparatus of the present invention featuring the assembly of a plurality of downcomer components each having an easily manageable size well suited for rapid assembly. As shown in FIGS. 4A and 4B, extending radially outward from the lower edge of the top downcomer panel and weir combination 18 is step platform 40, which in a preferred embodiment is substantially horizontal (+/−15° from a true horizontal plane at 0°) and more preferably horizontal (+/−3°). Step platform 40 preferably has an upper connector flange 42, which provides a convenient means for interconnecting step platform 40 to the top downcomer panel and weir plate 24 with the latter being made of a material of sufficient strength for providing the principal support to the entire downcomer apparatus by way of a direct connection with the tower 2, or more preferably, via an intermediary such as the illustrated thicker support bars 30 and 32 connected to the tower. Step platform 40 is shown in this embodiment as having a radially converging profile such that its radially outer edge 44 has a length L2 that is less than the length L1 of the radially inner edge 46. Step platform 40 is also preferably centered with respect to supporting plate 24 such that there is an equal length L3 to opposite sides thereof. Also, it is preferable for the end edges of tiplets 48 and 50 of support platform 40 to slope inward at the same angle A1 within the plane of the step platform such that outer edge 44 is centered with respect to inner edge 46. By varying length L2 of outer edge 44 and/or the slope of the tiplets 48, 50 upper edge it is possible to alter length L3 to suit the intended use.

FIG. 3A also illustrates the relationship between distances R1, R2 and R3 with R1 being the length between the centerpoint of tower 2 (having diameter D) to the inner edge 46 of step platform 40 (considered essentially the same as the downstream end 22 of the tray active bubbling area 15 in this embodiment), R2 being the distance between edge 46 and radial outer edge 44, and R3 being the length from outer edge 44 to the contact point of center line $C_L$ with tower 2 (or an outer downcomer concave envelope panel).

Preferably the ratio L1:L2 is from 3.5 to 1.5 and more preferably 2.5. Also angle A1 is preferably 15 to 75 degrees and more preferably about 35 degrees. Ratio R1:D and R2:D and R3:D are preferably from 0.1 to 0.4; 0.25 to 0.03 and 0.15 to 0.02, respectively. For a typical tower diameter of 40 inches, the preferred values are: $L_1=30"$, $L_2=12"$, $L_3=3.2"$, $D=40"$, $R_1=10"$, $R_2=6"$, $R_3=3.2"$.

Figure 3B:
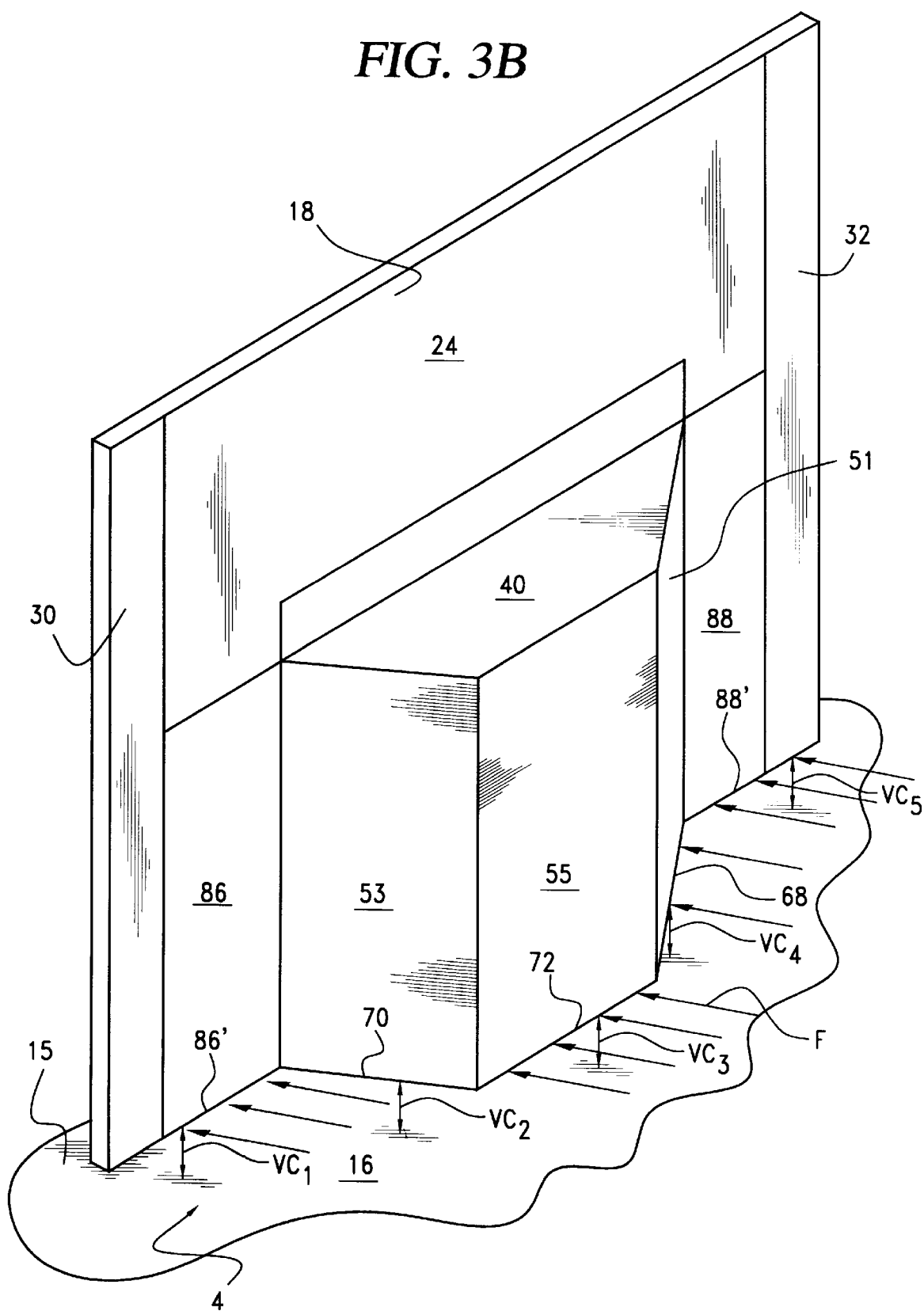
FIG. 3B is an enlarged view of the stepped arcuate downcomer apparatus of FIG. 1 without wing extensions for added clarity as to the schematic flow depiction shown therein.

In FIG. 2 at the exit opening 52 of the tray, the downcomer 8 receives the vapor-liquid mixture which flows over the weir 18. This two phase mixture, in a turbulent state, enters the upper reception area 54 of the downcomer 8 defined by step platform 40, at the bottom of the upper vertical downcomer panel 24 and, as shown in the illustration of the preferred embodiment of FIG. 2, by the interior surface of tower 2. Between the radial outer edge of step platform 40 and, in the preferred embodiment, the tower's interior surface, there is provided step openings $0_1$, $0_2$ and $0_3$ (FIG. 3). These step openings lead to lower reception area 56 defined by step wall panels 51, 53 and 55, the lower flange extensions 86 and 88 (See FIGS. 3B and 4A) and, again, for the illustrated embodiment, the interior surface of the tower. During the residence time of the mixture in the downcomer 8, vapors are deentrained from the liquid. The deentrained vapors rise, and the liquid is discharged from the outlet at the bottom end of the downcomer as will be described below. The downcomer thus has an upper reception area 54 and a lower area 56 differentiated along the vertical by step platform 40 (see FIG. 2). The upper portion 54 has a cross-section 58 best shown in FIG. 3A, which cross-section is above the step platform floor plane. Thus, the upper cross-section 58 is defined by the straight inner edge extending between points A and B and coinciding with weir 18 (in this embodiment) and a concave outer edge 60, which in this case is the tower's interior surface. The straight inner edge extending between A and B and the tangent of the concave section 60 both are perpendicular at their center to the central flow axis 11. Also the concave section 60 and the inner edge extending between A and B intersect and terminate at points A and B to define the overall downcomer cross-section 58 which corresponds to the open upper portion of the downcomer. The centerline $C_L$ of downcomer cross-section 58 is coincident with the central flow axis 11, and the "length" of this cross-section 58 is measured along the perpendicular to the centerline $C_L$.

The step platform 40 of stepped downcomer apparatus 8 is located in the downcomer cross-section 58 to influence the distribution and release of liquid traveling through the downcomer uniformly to the inlet side of the tray active bubbling area to facilitate deentrainment of vapors from the mixture and avoid poor flow characteristics. The step platform 40 thus occupies an area represented by the straight line extending between end points C and D (and falling between points A and B), and in a preferred embodiment, a tri-chordal line extension arrangement featuring lines which terminate and intersect at points C and D, respectively. The outlet openings $0_1$, $0_2$ and $0_3$ as well as at least the upper region of lower reception area 56 of downcomer 8 has a cross-section 62 (shown in FIG. 3A as well) which is taken at or below the step platform 40's floor plane (P2-FIG. 2) and is defined outwardly by outer edge 60 (the interior wall surface of the tower in this embodiment) and inwardly by the tri-chordal line extension defined by the radial outer edge of platform 40 and which terminates at points C and D.

With reference to FIG. 2, there can be seen upper plane P1 representing the height level of the liquid flow surface of tray 4, (feeding into the downcomer) intermediate plane P2 representing the height level of step platform 40 and plane P3 representing the lowest edge of downcomer 8 with respect to underlying tray at level P1'. The associated distance between the upper and immediate below trays 4 is designated by H1, the distance between cross-section planes P1 and P2 is referenced H2, the distance between P1 and P3 is referenced H3 while the distance between P3 and underlying P1' is referenced H4. In a preferred embodiment the step platform 40 has an intermediate position along the downcomer which position falls, for many applicable embodiments of the invention, at plane P2 which is below plane P1 in the range of 30 to 70% of the distance between the trays H1, more preferably 40 to 60%, and even more preferably positioned below plane P1 a distance represented by 50% of distance H1. For many applicable embodiments of the invention, the lower edge of downcomer 8 at plane P3 is preferably in the range of 4 to 16% of height H1 from plane P1' up, more preferably 6 to 12%, and even more preferably the distance is 8%. Portions of (or extensions of) the lower downcomer edge may extend to the tray deck at plane P1' for structural support and proper liquid distribution to the active bubbling area.

Thus as representative examples, the distance H1 between trays 4 is 12 to 36 inches such that the preferred range for H2 is 3.6 to 25 inches, the preferred range for H3 is 11.5 to 35 inches. Correspondingly, the preferred distance range for H4 for the distance from plane P1' to the lower edge of downcomer 8 is 0.5 to 6 inches. One representative (and not meant to be limiting) set of distances for an embodiment like than shown in the FIGS. 1 and 4 is H1=24; H2=12; H3=10 and H4=2 inches.

Preferably, the stepped downcomer apparatus is designed such that the relationship between the lower edge and the tray below is controlling as to downcomer flow along the tray as compared to flow down through the downcomer's lower area 56. The openings $0_1$, $0_2$, and $0_3$ in lower area 56 do help in introducing proportioned, desired volumes of liquid to the downcomer's lower edging to help in the downcomer and edging's control of fluid therepast. Also, a preferred embodiment features a generally horizontal platform surface 40 having, for example, an angle of not more than 30° above or below a 0° horizontal, more preferably a substantially horizontal tray that is not more than 15° above or below the same, and most preferably for most conditions one that essentially coincides with the horizontal so as to be referred to as "horizontal" (±3° to horizontal). Providing the step at an intermediate level and with a horizontal setting facilitates the desired flow of liquid in a direct radial out direction as well to opposite ends (i.e., opening regions $0_1$, $0_2$, $0_3$ of the platform) with entrained vapor exiting to the tray above. For any tray or step platform not being specifically set horizontal 0°, the values H1, H2, H3 and H4 can be considered as taken from the half way point in any rise vector for that surface. As shown in FIG. 3A, there is formed three separate step opening sections O1, O2 and O3, in the opening region between the illustrated multi chordal segmented extension between points C and D (representing the outer edges of step platform 40) and respective portions of the outer edge 60. The internal boundaries between openings O1, O2 and O3 are further defined by the short support plates 64 and 66 (FIGS. 3A and 4A) when utilized (or the FIG. 7 reference defining dashed lines "DL" at the same location when plates 64 and 66 are not utilized). The external boundaries of openings $0_1$ and $0_3$ are also defined by extensions 86 and 88 (as well as support bars and 32 when involved). These openings, in combination, thus define the overall step open region or lower cross section region 62 for downcomer 8 and in a preferred embodiment defines an open region that is 20 to 80% of the area of cross-sectional upper open region 58 and more preferably is 50% of the area 58.

Preferably, the area of the lower outlet region 62 is no greater than 80% of the area of the upper region cross-section, the transverse length between points C–D is at least 50% of the length A–B of the downcomer cross-section, and the average width of the downcomer step outlet is no more than 60% of the length along center line $C_L$ of upper region cross-section 58. Both ends of the outlet defining openings $O_1$, $O_2$ and $O_3$ are spaced from the downcomer centerline by a distance which is at least 10% of the radial width of the downcomer cross-section $(R_2+R_3)$.

As shown in FIGS. 1 and 4A, the stable support provided by the support members 30 and 32, provides an advantageous support platform for the vertical downcomer panel 24 of tray 4. FIGS. 1, 4A and 4B also illustrate the upper edge of opposite end tiplets 51 and 53 coinciding with platform edges 48 and 50, while the upper edge of central chordal step wall panel 55 coincides with outer edge 44 of platform 40. Step wall panels 51, 53, and 55 include lower edges 70, 72 and 68 which are shown in the illustrated embodiment as falling along a common horizontal plane although flow volume variations can also be implemented by varying the relative spacing between tray plane P1' and one or more of lower edges 68, 70 and 72 (See the discussion below as well as U.S. Pat. No. to 3,747,905, which is incorporated herein by reference).

The relative length of platform edges 44, 48 and 50 with respect to the tower diameter is preferably 0.15 to 0.7; 0.1 to 0.4 and 0.1 to 0.4, respectively, with a preferred embodiment having length ratios 0.4, 0.2 and 0.2. As further shown in FIGS. 4A and 4B, extending out from tiplets 51 and 53 are flange extensions 86 and 88 which extend parallel (and preferably generally on a common plane and/or as a monolithic unit depending on the downcomer size) with vertical plate 24, except in a below position. In addition, with reference to FIG. 4A, flange extensions 86 and 88 extend, at an upper end, into horizontal, radially inward extending tabs 90 and 92. These tabs are preferably doubled up (e.g., a weld connection) with respect to a radially inward full length flange extension at the bottom edge of rectangular plate 24 represented by reference number 94 in FIG. 4A. As shown in FIG. 1 the flange extension 94 and/or tabs 90, 92 provide support to the underside of the truncated end of tray 4 (which commonly is conventionally formed of a plurality of multiple tray component members). Vertical angle bridge (not shown) can be added to increase the support capacity between flange and tab 92.

The opposite ends of tiplets 53 and 57 preferably also are provided with inner transverse flanges 96 and 98 which provide a securement surface with respect to the overlying central tiplet 55 which, in a preferred embodiment, is bolted in position as shown in FIG. 4A. In addition, platform 40 is preferably provided with down flange extension 100 that is preferably bolted to the central chordal step wall panel 55 and flanges 96 and 98 at its ends. There is also preferably provided attachment extensions 102 and 104 at the upper end of tiplets 51 and 53 secured to the underside of platform 40. As described in greater detail below with respect to FIGS. 8A and 8E, for example, there can also be provided vertical trusses SM that extend along or parallel to the tray's central flow axis.

Reference is made to FIG. 3B for an illustration of the liquid flow travelling within inlet region 16 to the flow controlling lower downcomer by edges 86', 70, 72, 68 and 88'. The spacing between these flow controlling edges and the upper surface of tray 4 is represented for each of the above-identified edges by VC1, VC2, VC3, VC4 and VC5 (support bars 30 and 32 being commensurate with edges 86 and 88 for extensions 86 and 88 and preferably at least VC1 and VC5 are mutually representative). In the embodiment shown in FIG. 3B each edge of the flow controlling edging falls on a common plane such that preferably at least VC1=VC5, with a typical height range of 1.0 to 2.5 in (2.5 to 6.25 cms) being a representative range for many intended uses of the present invention. VC2 and VC4 can be closed as show in FIG. 8 to provide additional structural support, or, may be slotted with directional baffles to adjust the liquid flow lateral distribution onto the active bubbling area as shown in FIG. 8C. In some instances, only the outside cearances VC1 and VC5 are active or opened and VC2, VC3 and VC4 are closed off (or contact the tray below). Additional combinations of openings and closings for VC2, VC3 and VC4 are also possible such as having VC3 closed off. Preferably if VC2 and VC4 are retained open, they have symmetrical clearance spacings. When VC3 is open, VC1 and VC5 preferably have a 10 to 50% greater clearance spacing than VC3.

FIGS. 1 and 4A also illustrate wing or chordal extensions 74 and 76 that are provided so as to extend off the transverse ends of the central chordal step wall panel 55 and preferably extend out into a supportive relationship with respect to the interior of the tower wall surface (or the envelope member defining concave outer edge 60). FIGS. 4A and 4B further illustrate the preferred manner of providing wing extensions 74 and 76 with relatively shorter width, thicker support plates 64 and 66 transversely external of integral extensions 78 and 80 of the central chordal step wall panel 55. In addition, wing extensions 74 and 76 are provided with through hole sets 82 and 84, which in a preferred embodiment are a series of transversely spaced rows of vertically extending through passages. The through passages are positioned external to the step wall panels (thus not degrading the vapor containment described below), but close (within 5 inches) to the intersection of the tiplets with the central chordal panel. The through passages function to avoid unequal liquid build up within any of the lower sections of the downcomer defined by the downcomer step wall. The combination of the attachment of the transverse outer ends of the radially internal wall region of the downcomer and the transverse outer ends of the radially external wings to the different chord location on the interior surface of the tower provides for a highly stable and easily attached means of securement, that is particularly well suited for larger tower diameters (e.g., greater than 8 ft).

Figure 5A:
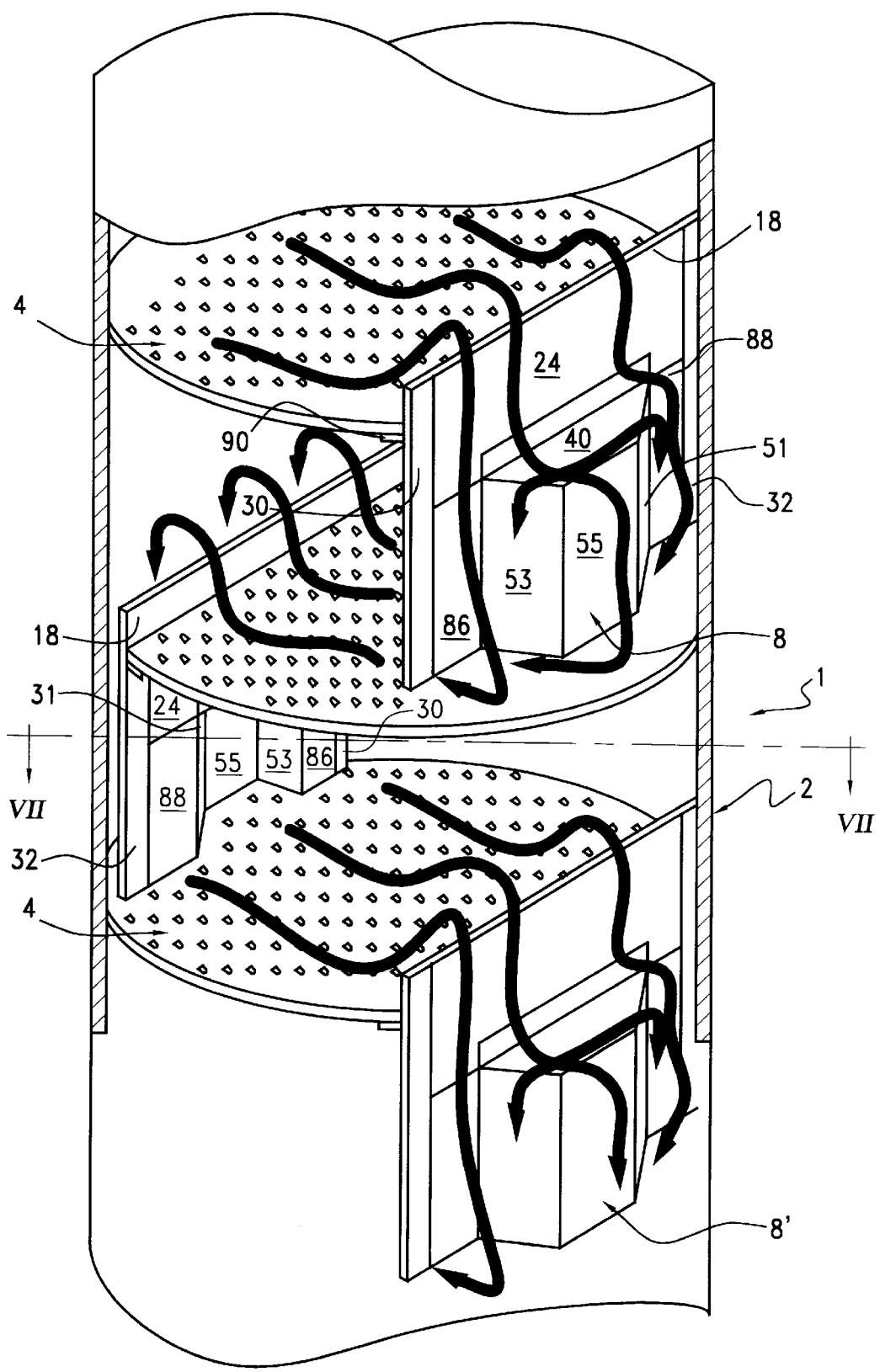
FIG. 5A is a diagrammatic perspective view of a vapor-liquid contact apparatus like FIG. 1, but with an alternate embodiment of the stepped downcomer apparatus (free of tower supplemental support wing extensions) with an added rough schematic illustration of liquid flow through the apparatus.

FIG. 5 illustrates an alternative embodiment of the invention wherein the stepped downcomer apparatus 8' is free of wing extensions 78, 80 which arrangement is well-suited for smaller diameter vessels where the downcomer 8 apparatus can be supported solely by the principal support means (bars 30 and 32 connected with panel 24). FIG. 5 also illustrates in rough schematic fashion a through downcomer flow pattern for the mix traveling over weir 18. FIG. 6 provides a schematic, general illustration of the vapor and liquid passage through an embodiment such as that shown in FIGS. 1 and 5 of the present invention. As shown in FIGS. 5 and 6, the fluid mix flows over the weir, downwardly within the larger open portion 52 and into contact with the step platform 40 leading to the development of flow regions traveling over the step's central edge as well as to opposite ends of the step. In addition, FIG. 5 illustrates that some of the flow over the upper edge of weir drops directly into the openings outward from the tiplets down into the corresponding sections of inlet region 16 for direct flow under the lower edges 86' and 88'. As best shown in FIGS. 5 and 6, step 40 acts as a de-entrainment platform wherein the gas component of the mix is partially released and the liquid builds up in a sealing fashion. Liquid thus escapes through lower downcomer area 56 where it eventually is released to the lower tray 4.

Figure 7:
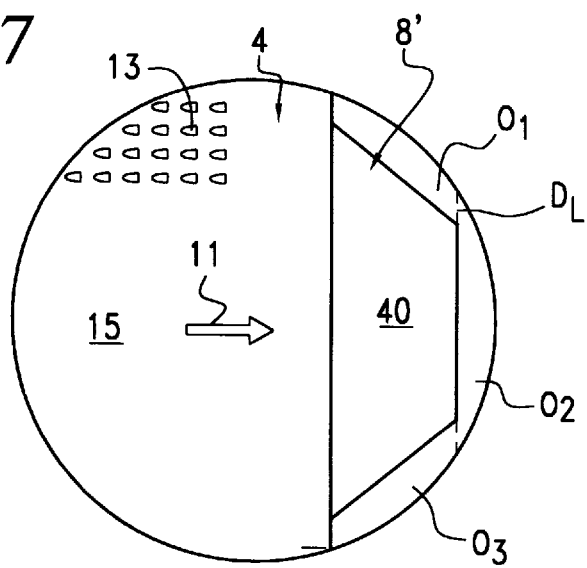
FIG. 7 illustrates an alternate embodiment of the downcomer and tray assembly of the vapor-liquid contact apparatus of the present invention free of wing extension supports.

FIG. 7 provides a cross-sectional view taken along cross-section VII—VII in FIG. 5 which shows the step platform free of wing extensions.

Figure 8A:
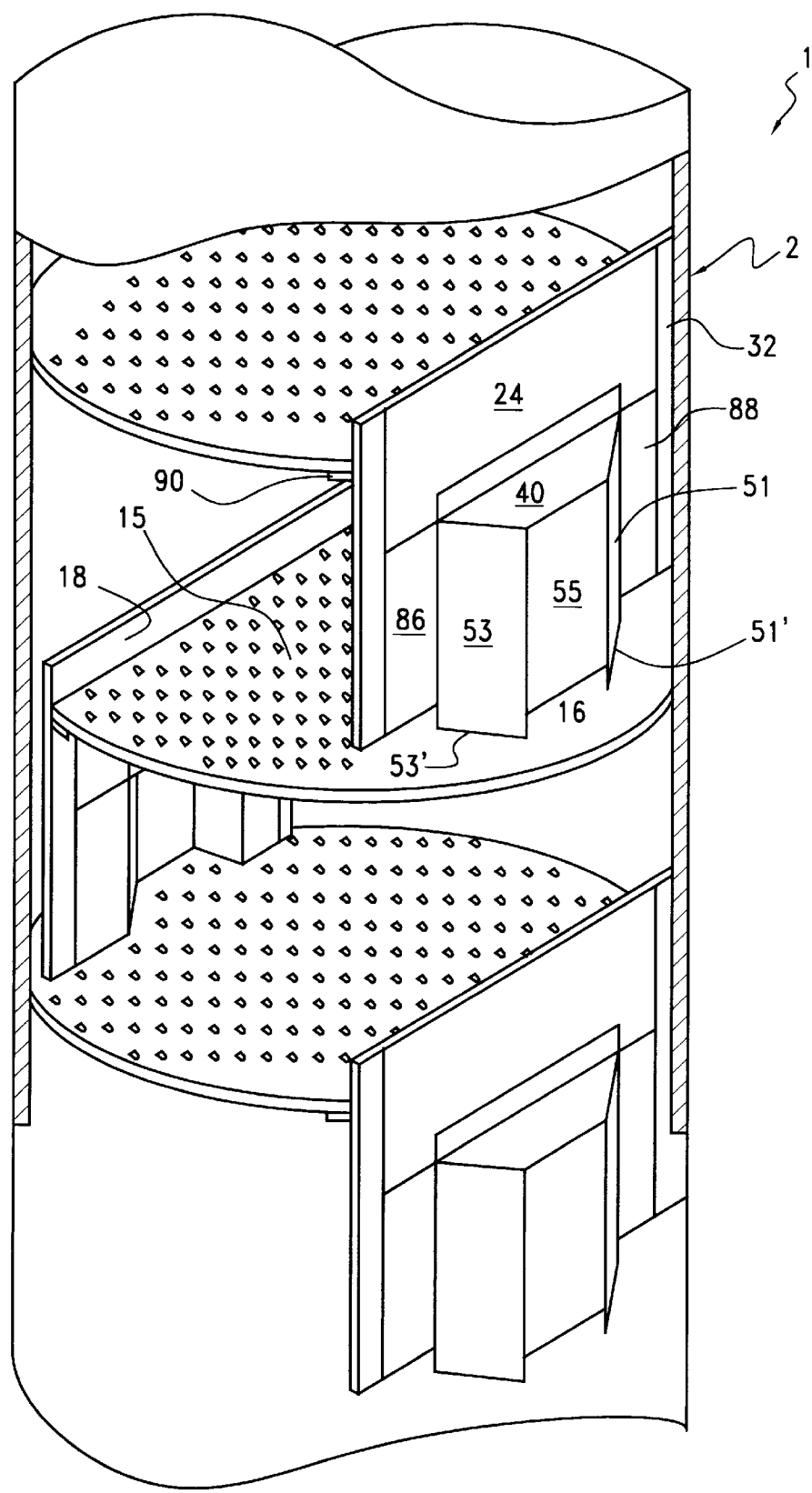
FIG. 8A is a diagrammatic prospective view of a vapor-liquid contact apparatus like that in FIG. 1, but with an alternate embodiment of stepped downcomer support featuring tiplet extension supports.

FIG. 8A illustrates an alternate embodiment of the present invention having generally the same features as the earlier described embodiment shown in FIG. 5, which is free of wing or chordal extensions 74, 76 used earlier in the embodiment of FIG. 1, but with tiplets 51 and 53 being modified to have tiplet extensions, to provide additional support to the downcomer.

Figure 8B:
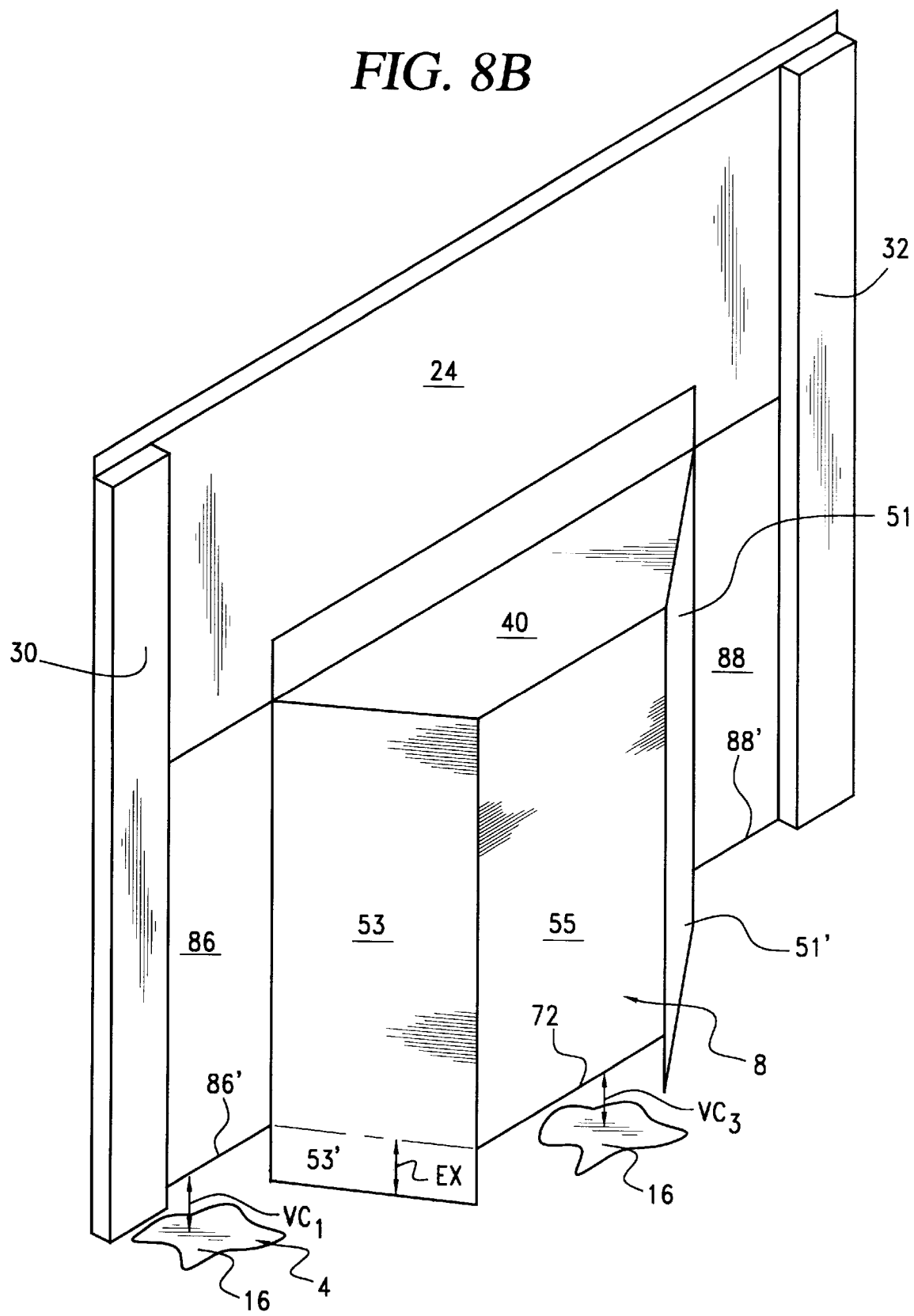
FIG. 8B provides an enlarged, perspective view of the stepped downcomer apparatus shown in FIG. 8A with the tiplet extension supports.
Figure 8C:
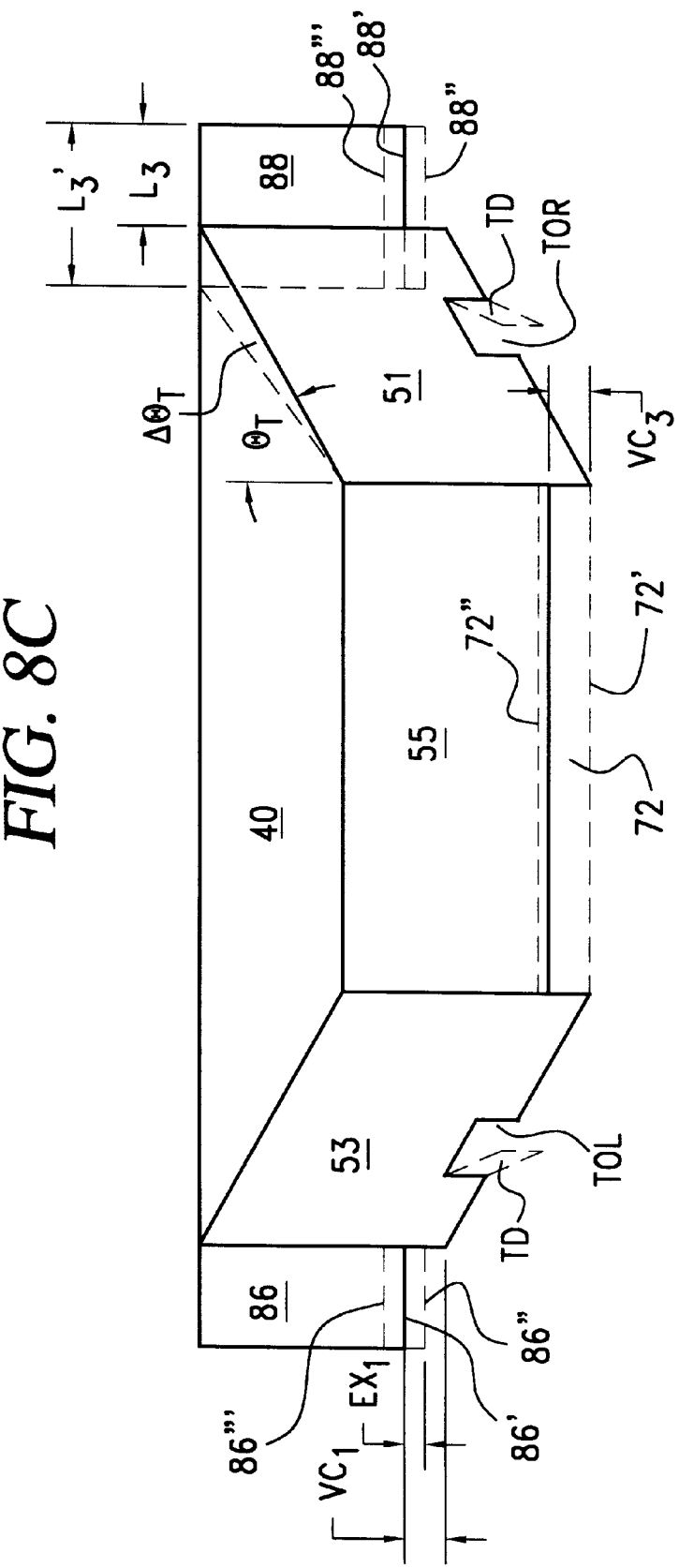
FIG. 8C provides a front elevation view of that which is shown in FIG. 8B, together with some possible flow adjustment illustrations including added tiplet extension flow through passageway means, as well as representation of some of vertical column flow through adjustment possibilities.

In the embodiment shown in FIG. 7 the sole means of support for downcomer 8' is vertical supports 30 and 32 which are generally parallel with weir 18 and, in this embodiment, are welded directly to the interior surface of tower 2. The arrangement shown in FIG. 7 is particularly suited for smaller diameter towers such as those having a diameter of 8 ft or less. Dashed lines "DL" represent imaginary lines which have been provided to help to illustrate the three different step openings 01, 02 and 03. In an alternate embodiment of the invention (not shown) reliance can be placed on support means (SM), which can include the tiplet extensions and/or and extended step wall panel described above (see as well a discussion of some other embodiments of the support means SM discussed below) as the primary or sole means of support, in which case extensions 30 and 34 and/or wing extension 74 and 76 are not utilized FIG. 8B shows an enlarged perspective view of the stepped downcomer apparatus 8 shown in FIG. 8A with the added tiplet extensions 51' and 53' (represented by the portions of panels 51 and 53 extending below each of lower edges 86', 72, and 88'. In the illustrated embodiment extensions 51' and 53' extend down into supporting contact with tray 4 (shown in cut away) such that the flow control passageway with spacing VC1 is equal with the tiplet extension EX. Thus, tiplet extension 51' and 53' provide additional means of support in addition to support bars 30 and 32 that are cut off at lower edge of 86 panel Tiplet extension 53' and 51' also function to facilitate desirable directional flow patterns in the liquid flow providing under the downcomer, FIG. 8C illustrates some of the modifications that can be made in the stepped downcomer apparatus to vary liquid flow passage characteristics from the inlet side to the active area downstream from the downcomer. As shown in FIG. 8C, the lower edge of extensions 86 and 88 can be dropped or raised either with other edge sections or independent (preferably a symmetrical arrangement with extension 88 is maintained).(See for example sets 86', 86"and 88'" and 88', 88"and 88'"). In addition to these vertical flow through height adjustments, variations can be made in the relative chordal length of extensions 86 and 88 either by adjusting the angle ($\Theta T$) angle (and edge length of the tiplets) by $\Delta\Theta T$ as represented by the shortened extension length, modifying the chordal length of panel 55 and making the appropriate length adjustments in the tiplets and/or by providing the tiplets with an outward slope as described below with reference to FIGS. 9 and 10. FIG. 8C also shows some of the setting variations that can be made relative to the other edge sections including the lowering of the solid line edge level for edge 72 to the level represented by dashed lines for edge 72' or by raising the vertical flow through column height by raising the edge to the upper edge level 72". Again, the relative spacing of edges 86, 88 with respect to edge 72 can be set at a common level or varied so as have extension edges defining greater or lesser flow though heights as the central edge 72.

The embodiment illustrated in FIG. 8C shows the tiplet extensions extending down into a support relationship with the tray below. For embodiments such as in FIG. 1 where the tiplets do not extend down to the tray, flow variations can also be achieved by setting a relative vertical distance with respect to the tray below so as to be at locations other than the maximum vertical spacing of other edge sections in the lower edging of the stepped downcomer apparatus. FIG. 8C further illustrates that central panel 55 can also extend down (see 72') into contact (e.g., supporting contact) with the tray below. As noted above, with an embodiment like that shown in FIG. 3B, the central panel can be the only panel extending down into contact with the tray below although other combinations are also possible such as the central extending down with the tiplets with or without doors TD.

In addition to the straight line adjustments shown in FIG. 8C flow volume variations can also be achieved with respect to the noted edging by way of sloped, slotted or curved edging differences/additions along the length of the edging, but the straight edge height variations represented in FIG. 8C are preferred. In addition, openings can be provided along the length of a tiplet extension contacting the tray below. FIG. 8C illustrates one embodiment of a flow opening provided at one or more locations along the tiplet extension. In FIG. 8C, a central door TD is provided in each tiplet extension and oriented so as to be parallel with the central flow axis along tray 4.

Figure 8D:
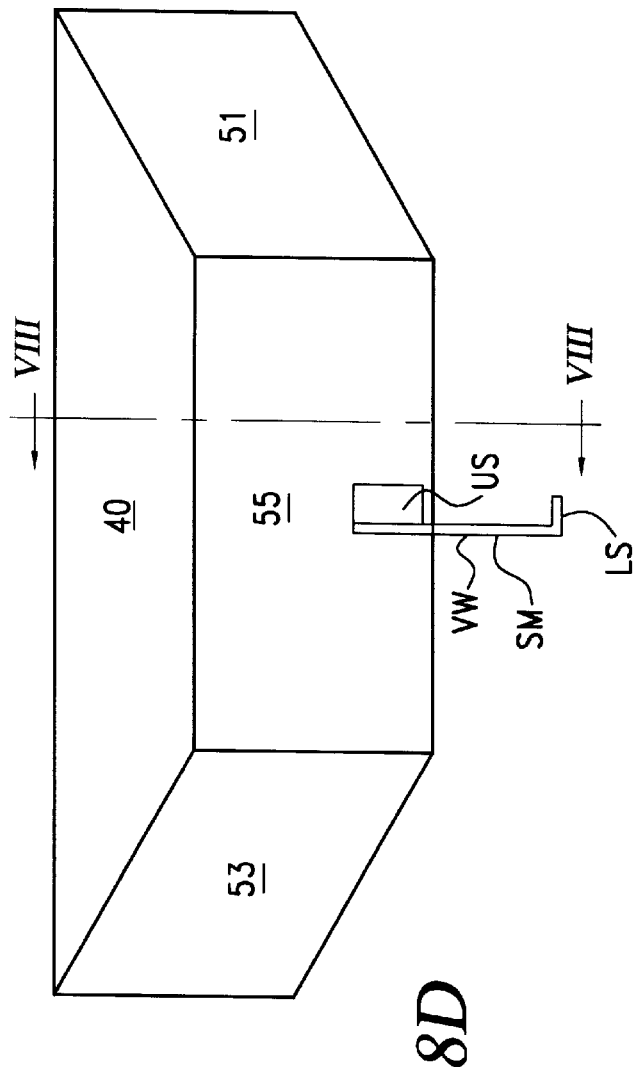
FIG. 8D shows, in a front elevational view, an alternate embodiment of the stepped downcomer apparatus of the present invention with added tray support extension.
Figure 8E:
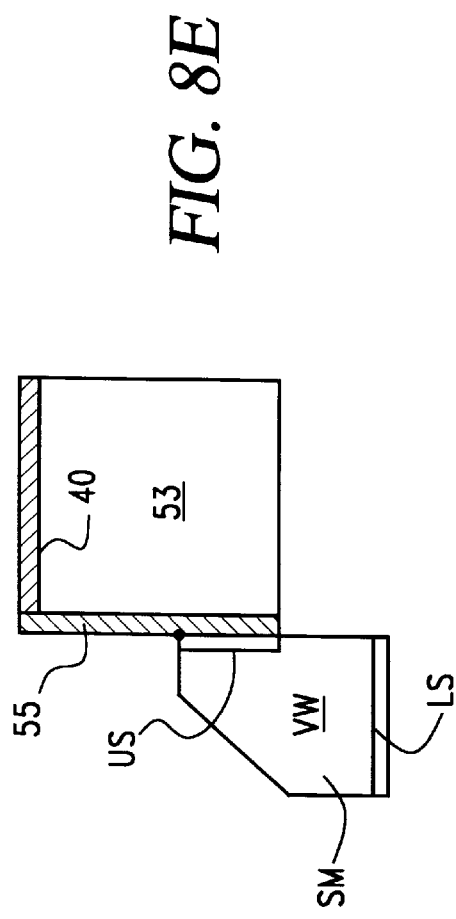
FIG. 8E shows a side view of that which is shown in FIG. 8D.

FIGS. 8D and 8E illustrate an alternate secondary support means for supporting the downcomer by way of a support extending between one or more of the wall panels 51, 53 and 55 extending below and away from the peripheral edge of step platform 40 (which is preferably in a tri-chordal arrangement although additional chordal extensions can be used, but the tri-chordal is preferred as it provides good opposite side and central flow distribution and is designed in relationship to extensions 86 and 88). Secondary support means SM is designed in the embodiment shown in FIGS. 8D and 8E to be of minimal obstruction with respect to the flow controlling lower edging of the downcomer and thus has vertical wall VW arranged coincident with the central axis. One or more individual support means SM can be utilized intermediate one or more of the panels 51, 53 and 55 or at the vertical boundary edges thereof. Support means SM is shown in bracket form in FIG. 8E and includes upper and lower attachment extensions for attachment with the panel and tray, respectively, such as by way of welding or bolting. As noted above for most usages, the support means is used as a secondary support means although for some usages of the present invention reliance can be placed on support means as the primary or sole support for the downcomer apparatus.

Figure 9:
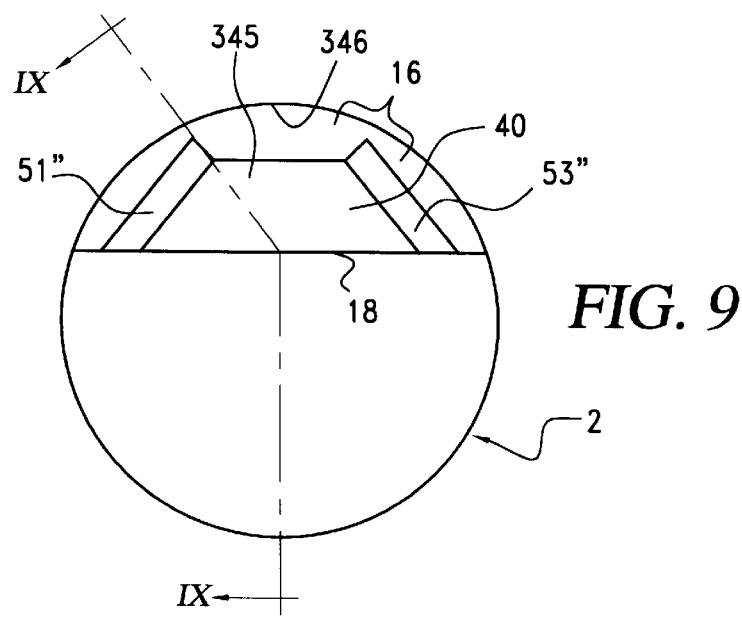
FIG. 9 is a representative illustration depicting an alternate embodiment of the present invention featuring obliquely arranged and outwardly extending tiplets.
Figure 10:
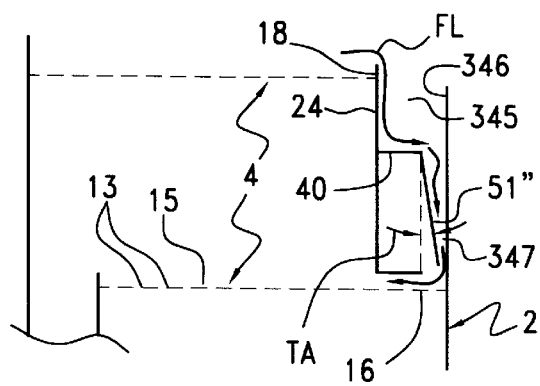
FIG. 10 shows a cross-sectional view of that which is shown in FIG. 9 taken along cross-section line IX—IX in FIG. 9.

FIGS. 9 and 10 illustrate an alternate embodiment of the invention featuring outwardly sloped tiplets 51" and 53"

extending outwardly from the outer boundary region of platform 40. As shown by FIG. 10, the oblique nature of the tiplets such as the illustrated tiplet 51" provides a decrease in flow though volume of the liquid-vapor mix flow FL passing over weir 18 and first into the reception area 345 above platform 40 and between the panel 24 and the inner surface 346 of tower 2 and then into the region 347 partially defined by the sloped tiplet. This renders the downcomer well suited for processes such as those involving high pressure or otherwise requiring a greater difference in the downcomer cross-sectional area in going from the top to bottom. A slope angle TA of up to 45° is well suited for use in many of the above noted situations where a volume differential is desired.

Figure 11:
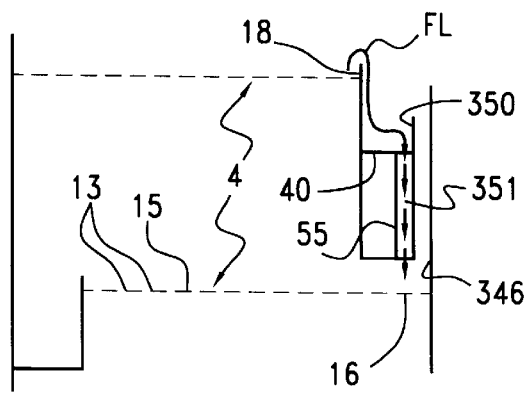
FIG. 11 shows a cross-sectional view of an alternate embodiment of the stepped downcomer apparatus having a step platform and step panels as shown in FIG. 7, but with an outer downcomer concave wall independent of the concave tower wall (an envelope arrangement).

FIG. 11 illustrates an alternate embodiment of the present invention (having a similar cross-sectional arrangement as that in FIG. 2) featuring an envelope arrangement wherein rather than the interior surface 346 representing the outer wall of the downcomer, wall structure 350 is provided as the outer wall region of the downcomer and is preferably concave in configuration such as a concentric relationship with the tower wall. Thus, a flow through passage is provided between wall 350 and the step panels with panel 55 being represented in FIG. 11. The preferred embodiment features the lower edge of the downcomer as the controlling means in the flow leading to and along the below positioned tray, although the step platform arrangement is also designed to provide efficient flow through characteristics from a horizontal cross section flow perspective. With envelope downcomers the outer wall envelope must be sealed to the tower wall at its end for this design to function properly.

FIGS. 12–17 illustrate embodiments of the invention which utilizes a preferred aperture configuration, in some instances supplemented by jets which are designed to contribute to flow uniformity on a tray.

As shown in FIG. 12, the tray 110, near its liquid infeed area 112, has a plurality of jets 114, each of which, as shown in FIGS. 13 and 14, consists of an inclined U-shaped deflector tab 116 which is formed of the tray material. The tab is struck up from the tray during fabrication, leaving a U-shaped vapor opening 118 in the plane of the tray. The tab is connected to and supported on the tray deck by a fold line 120. Jets of this type are known in the art as "Jet Tabs" (see for example U.S. Pat. No. 2,684,837 to North et al. which is incorporated by reference). Another example of a jet that may be used is shown in FIG. 16. This tab is struck up from the tray during fabrication, leaving a small forward facing opening 218 above the plane of the tray. Jets of this type are known as C-slots (See, for example, U.S. Pat. No. 4,101,610 which is incorporated by reference). Other jets may be used, including those which include an opening in the tray, a horizontal deflector which is spaced above the opening and has a shape and size corresponding generally to the opening, and short sidewalls which connect the perimeter of the opening with the perimeter of the deflector, except in a side through which the vapor jet is directed. Such jets are usually integral with and struck up from their tray decks.

The directional orientations of the jets in FIG. 12 are such that vapor ascending through the openings 118 will strike the tabs 116 and be diverted in a direction which will impel the liquid in a forward direction, away from the liquid infeed area and toward the wider regions of the bubbling area of the tray, thus contributing to the uniform distribution of liquid across the width of the tray. To promote this effect, and as can be seen in FIG. 12, the concentration of jets 114 is less near the central flow axis than at locations which are laterally spaced from the central flow axis. The spacing density of the jets may increase progressively from a minimum at the central flow axis to a maximum at the sides of the jet area of the tray. The jets near the ends of the of the downcomer slot openings may have divergent centerlines as shown in FIG. 12, to direct flow along the vessel wall.

The vapor-introducing apertures in the embodiment of FIG. 12 are a preferred configuration which is known in the industry and described in detail in U.S. Pat. No. 5,360,583, the entire contents of which are incorporated into this specification by reference. The trapezoidal elements 122 in FIG. 12 are stationary horizontal deflectors. As shown in greater detail in FIG. 15, these deflectors 122 overlie corresponding apertures 124 in the plane of the tray deck, and the upstream and downstream ends of the deflectors 122 are connected to the tray deck. With this construction, the ascending vapors are introduced laterally into the liquid. Trays provided with apertures of this type are marketed and known in the industry as MVG trays.

Figure 17:
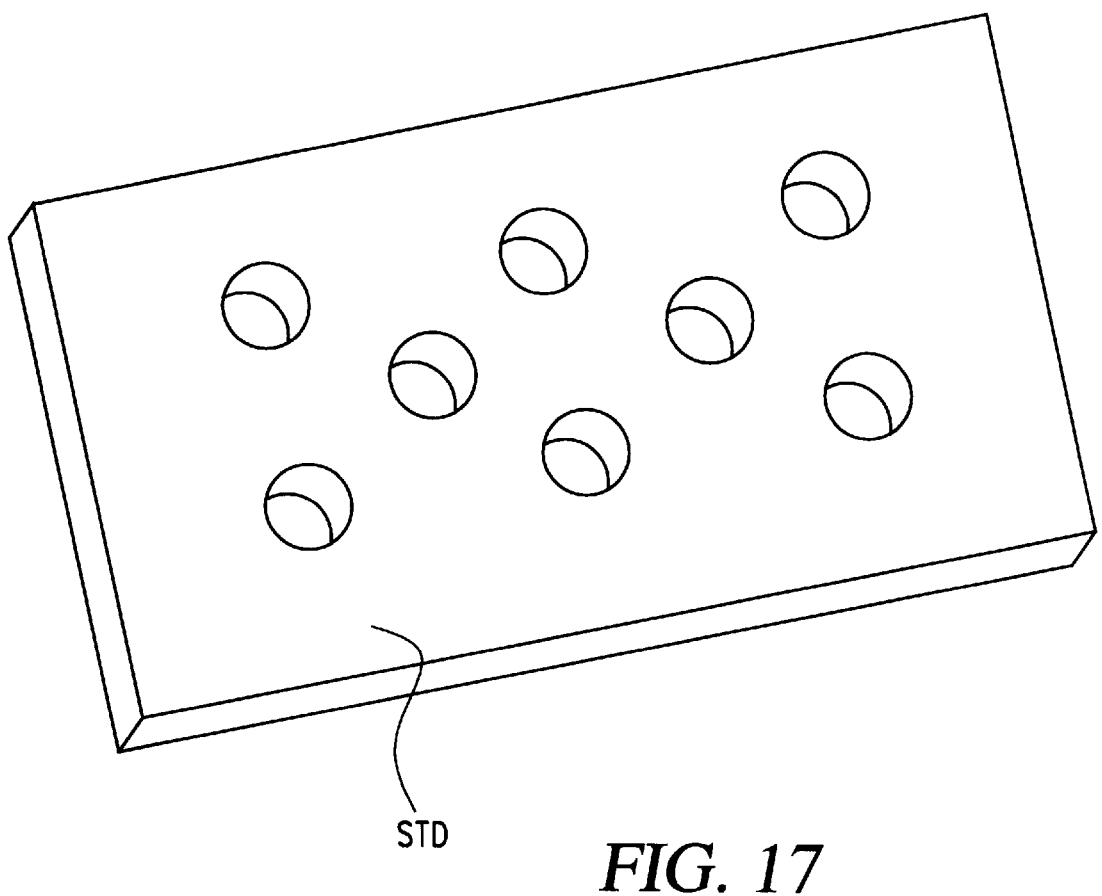
FIG. 17—is a sieve tray vapor aperture alternate.

Because the downcomer configuration of the present invention provides highly effective liquid distribution to the active bubbling area, the present invention can also be readily used in many instances with perforated active bubbling areas. An example of a sieve tray deck section "STD" is shown in FIG. 17 (low cost and easily manufactured)

Although the drawings accompanying this specification illustrate only sieve trays and MVG trays, the invention is suited for many different types of apertured trays known in the art, including valve trays and bubble cap trays. Although only a few embodiments of the invention have been specifically disclosed, persons skilled in the art will realize that the invention may take many other forms. Accordingly, it is emphasized that the invention is not limited to the disclosed embodiments, and it embraces modifications, variations, and improvements thereto which fall within the spirit of the following claims.

What is claimed is:

1. A downcomer step apparatus for use in a vapor liquid contact apparatus, comprising:

a radially interior inlet downcomer panel which, in conjunction with a boundary downcomer wall, defines an inlet opening of a downcomer vapor-liquid flow through passageway;

a step platform extending radially outward with respect to said inlet downcomer panel at an intermediate level of the downcomer vapor-liquid flow through passageway;

a step wall extending below said step platform, said step wall having an outer wall panel, and two tiplets extending to opposite sides of said outer wall panel;

first and second extensions with the first extension extending out away from a first of said tiplets toward the vessel wall and a second extension extending out away from a second of said tiplets toward the vessel wall so as to define along a lower edge of said first and second extensions liquid flow-through passageways with respect to an underlying tray.

2. A step apparatus as recited in claim 1 wherein said first and second extensions extend parallel with said interior inlet downcomer panel and said tiplets are oriented in oblique fashion with respect to said extensions and said outer panel wall.

3. A step apparatus as recited in claim 2 wherein a lower edge of each of said first and second extensions is on a common plane.

4. A step apparatus as recited in claim 2 wherein said outer wall panel is a chordal wall panel that extends parallel with the interior inlet downcomer panel, and said first and second extensions extend down to a lower edge commensurate with that of said outer wall panel.

5. A step apparatus as recited in claim 4 wherein each of said tiplets form an obtuse angle with respect to an interior wall surface of said chordal wall panel.

6. A step apparatus as recited in claim 2, further comprising securement means for securing said extensions to different locations of the downcomer outer boundary wall or vessel.

7. A step apparatus as recited in claim 6 wherein said securement means includes support bars that extend along respective outer edges of said extensions and along the interior inlet downcomer panel extending above and inward of said first and second extensions.

8. A step apparatus as recited in claim 1 wherein each of said tiplets form an obtuse angle with respect to an interior wall surface of said outer wall panel.

9. A step apparatus as recited in claim 1, wherein said interior inlet downcomer panel includes a plate to which said platform is attached at a radially inner region.

10. A step apparatus as recited in claim 1 further comprising a tray support positioned to receive an outlet end of the above positioned tray, said tray support means extending radially inward from said interior inlet downcomer panel with said step platform extending radially outward from said inlet downcomer panel.

11. A step apparatus as recited in claim 1, wherein said interior inlet downcomer panel has a vertical width such that, in use, the upper region of said plate defines a weir.

12. A step apparatus as recited in claim 1 wherein a distance from an interior edge of a respective one of said first and second extensions out to an attachment location on an adjacent portion of said boundary downcomer wall represents about 20 to 40% in sum of the total distance of a chordal dimension line extending flush with said first and second extensions and between contact points with opposite end regions of the interior inlet downcomer panel.

13. A step apparatus as recited in claim 12 wherein the outer wall panel has a chordal length which is 40 to 80% of the total distance of the chordal dimension line.

14. A step apparatus as recited in claim 12 wherein said tiplets are obliquely arranged with respect to the interior inlet downcomer panel and each have a slope run up to 30% of the chordal dimension line.

15. A step apparatus as recited in claim 1, wherein the step apparatus defines a downcomer with the outer downcomer boundary wall forming an integral component of said step apparatus and said outer downcomer boundary wall is positioned radially inward of a corresponding interior wall surface of the vessel.

16. A step apparatus as recited in claim 1, wherein said step apparatus defines a downcomer and comprises an outer boundary wall represented by an interior surface section of the vessel in use.

17. A step apparatus as recited in claim 1, wherein said step platform is plus or minus 30% from horizontal.

18. A step apparatus as recited in claim 17, wherein said interior inlet downcomer panel and outer wall panel are both within plus or minus 3° from a true vertical plane.

19. A step apparatus as recited in claim 1, wherein said step platform has a central chordal outer radial edge and two tiplet edges where extended in divergent fashion from the opposite ends of the central chordal outer radial edge.

20. A step apparatus as recited in claim 1 including a primary first securement means for attaching said flange extensions to the vessel and second securement means for further attaching said step assembly in position with respect to the vessel.

21. A step apparatus as recited in claim 20 wherein said second securement means includes chordal extensions extending from opposite ends of said outer wall panel.

22. A step apparatus as recited in claim 21, wherein said chordal extensions each includes at least one pressure equalization hole.

23. A step apparatus as recited in claim 20 wherein said second securement means includes at least one foot extending down from a lower edge of said step wall.

24. A step apparatus as recited in claim 1, wherein said first and second extensions are integral with respective inner edges of said tiplets and are in contact with said downcomer inlet panel.

25. A step apparatus as recited in claim 1, wherein said tiplets extend vertically down farther than said outer wall panel.

26. A step apparatus as recited in claim 25 wherein said tiplets extend sufficiently as to contact a below positioned tray in use.

27. A step apparatus as recited in claim 26 wherein said tiplets include flow baffles provided in a lower edge region of said tiplets.

28. A step assembly as recited in claim 1, wherein said tiplets include flow baffles provided in a lower edge region of said step wall.

29. A step assembly as recited in claim 1 wherein said step platform has three straight flow over edges including a center edge commensurate with said outer panel wall, and two tiplet edges commensurate with said tiplets.

30. Step apparatus as recited in claim 1 further comprising support means extending from said step wall to a sufficient length to contact an underlying tray, and said support means having an offset edge portion to minimize flow resistance traveling past said support means.

31. A step apparatus for use in a vapor-liquid contact apparatus downcomer, which vapor liquid contact apparatus includes a vessel within which is provided the downcomer and vapor-liquid contact trays, and with the downcomer having a radially outer boundary downcomer wall, said step apparatus comprising:

a radially interior inlet downcomer panel which, in conjunction with said boundary downcomer wall, defines an inlet opening of a downcomer vapor-liquid flow through passageway;

a step platform extending radially outward with respect to said inlet downcomer panel at an intermediate level of the downcomer vapor-liquid flow through passageway;

a step wall extending below said step platform to define, with respect to the outer boundary downcomer wall, a lower reception area of the downcomer vapor-liquid flow through passageway, and, with respect to a below positioned vapor-liquid contact tray, at least a part of a downcomer-tray flow through passageway, and said step wall having an outer wall panel, and two tiplets to opposite sides of said outer wall panel, with said tiplets extending from said outer wall panel radially inward to define a first reception area opening region between said outer wall panel and the outer boundary downcomer wall, and second and third reception area opening regions between respective tiplet wall panels and the outer boundary downcomer wall, and wherein said tiplets are arranged such that planes defined by said tiplets contact a plane defined by said inlet downcomer panel at first and second plane intersect locations radially inward of the downcomer outer boundary wall, and wherein respective first and second extensions extend outward away from said first and second plane intersect locations toward the outer boundary wall, and said first and second extensions have lower edges positioned above the below positioned vapor-liquid contact tray so as to provide flow through regions in the downcomer-tray flow through passageway between the lower edges of said first and second extensions and the below positioned vapor-liquid contact tray.

32. A vapor liquid contact assembly, comprising:
a tower;
an upper tray supported by said tower;
a lower tray supported by said tower;
a downcomer apparatus as recited in claim 1, which is supported by said tower and positioned within said tower.

33. A vapor liquid contact method comprising directing a gas through both an upper and lower tray supported within a tower;

directing fluid across the upper tray supported within said tower above said lower tray such that the fluid contacts the gas passing through the upper tray to form a vapor-liquid mix;

directing the vapor liquid mix into a downcomer positioned so as to feed resultant fluid exiting said downcomer to the lower tray, said downcomer having an intermediate step platform and a step wall attached to and extending down from said step platform, which are dimensioned and arranged such that a portion of the fluid contacts said platform and flows off the platform and another portion of the fluid drops directly down to the lower tray free of contact and to opposite sides of the step platform, and wherein lower edging of said downcomer controls, by way of relative vertical spacing between the lower tray and the downcomer lower edging positioned above the lower tray, horizontal fluid flow passing under the lower edging toward an active area of the lower tray.

34. A vapor liquid contact assembly, comprising:

an upper tray;

a lower tray; and a downcomer having, (a) a radially interior inlet downcomer panel which, in conjunction with a boundary downcomer wall, defines an inlet opening of a downcomer vapor-liquid flow through passageway extending between said upper and lower tray, (b) a step platform extending radially outward with respect to said inlet downcomer panel at an intermediate level of the downcomer vapor-liquid flow through passageway, (c) a step wall extending below said step platform, said step wall having a peripheral panel section which extends between spaced first and second points on said downcomer panel;

(d) first and second extensions, with the first extension extending out from the first of said points toward an adjacent region of said vessel wall and a second extension extending out from a second of said points toward another region of said vessel wall, and wherein said first and second extensions have respective first and second lower edges, and said first and second lower edges are vertically spaced above the lower tray to provide flow control relative to fluid passing under said first and second edges in passing from an infeed portion of the underlying tray to an active area of the underlying tray.

35. The apparatus of claim 34 wherein said lower tray has a bubbling area that extends radial out past a vertical plane extension of said inlet downcomer panel.

36. The apparatus of claim 34 wherein a height of the flow through passageway sections represents 4 to 16% of a vertical spacing height of said upper and lower trays.

37. A downcomer step assembly for use in a vapor liquid contact apparatus, comprising:

a radially interior inlet downcomer panel which, in conjunction with a boundary downcomer wall, defines an inlet opening of a downcomer vapor-liquid flow through passageway;

a step platform extending radially outward with respect to said inlet downcomer panel at an intermediate level of the downcomer vapor-liquid flow through passageway;

a step wall extending below said step platform, said step wall having an outer wall panel, and two tiplets extending to opposite sides of said outer wall panel;

first and second extensions with the first extension extending out from a first contact location relative to a first of said tiplets toward an adjacent first vessel wall portion and the second extension extending out from a second contact location relative to a second of said tiplets toward an adjacent second vessel wall portion so as to define, along lower edges of said first and second extensions, which lower edges are positioned above an underlying tray, flow through passageway sections with respect to the underlying tray, and wherein a chordal distance between said first and second contact locations is 1.5 to 3.5 times greater than a chordal distance of said outer wall panel.

38. A vapor liquid contact assembly, comprising:

an upper tray;

a lower tray;

a radially interior inlet downcomer panel which, in conjunction with a boundary downcomer wall, defines an inlet opening of a downcomer vapor-liquid flow through passageway extending between said upper and lower tray;

a step platform extending radially outward with respect to said inlet downcomer panel at an intermediate level of the downcomer vapor-liquid flow through passageway;

a step wall extending below said step platform and having outer ends spaced apart along said inlet downcomer panel;

first and second extensions with the first extension extending out from a first of said outer ends toward a first region of the vessel wall and a second extension extending out from a second of said outer ends toward a second region of the vessel wall, and wherein there is provided, in at least one of said step wall and first and second extensions, a difference in vertical spacing relative to the lower tray below, and wherein said first and second extensions have lower edges that are positioned above the lower tray so as to define between the lower tray and lower edges fluid flow through passages.

39. The assembly as recited in claim 38 wherein a vertical spacing difference exists between a first vertical spacing distance relative to the lower tray for said extension walls and a second vertical spacing distance relative to the lower tray for said step wall.

40. The assembly as recited in claim 39 wherein the extension walls have a greater vertical spacing than at least a portion of said step wall relative to the lower tray.

41. The assembly as recited in claim 38 wherein at least one amongst said extension walls and step wall has varied height lower edging.

42. The assembly as recited in claim 41 wherein the varied height lower edging includes one or more flow through doorways.

43. The assembly as recited in claim 42 wherein said doorways include door extensions aligned with a direction of fluid travel making contact with said door extensions.

44. The assembly as recited in claim 38 wherein at least one amongst said extension walls and step wall has a varied height lower edging defined by slots formed in said lower edging.

45. The assembly as recited in claim 38 wherein at least a portion of said step wall extends closer to said lower tray than said extension walls.

46. The downcomer step apparatus as recited in claim 34 wherein said lower tray has an active bubbling region which extends radially farther out than a vertical plane extension of said downcomer panel such that the active bubbling region is covered by said step platform.

47. The downcomer step apparatus as recited in claim 1 wherein there is provided, in at least one of said step wall and first and second extensions, a difference in vertical spacing relative to the underlying tray below.

48. The assembly as recited in claim 47 wherein the extension walls have a greater vertical spacing than that of said step wall relative to the underlying tray.

49. The assembly as recited in claim 47 wherein at least one amongst said extension walls and step wall has a varied height lower edging.

50. The assembly as recited in claim 47 wherein the varied height lower edging includes one or more flow through doorways or slots.

51. The step apparatus as recited in claim 1 wherein the vertical spacing relationship includes a spacing that is 4 to 16% of a total height extending from the underlying tray vertically below said lower edges to an above positioned tray level feeding said downcomer apparatus.

52. The step apparatus as recited in claim 31 wherein the vertical spacing relationship includes a spacing that is 4 to 16% of a total height extending from the below positioned vapor-liquid contact tray vertically below said lower edges to an above positioned tray level feeding said downcomer apparatus.

53. A downcomer step apparatus for use in a vapor liquid contact apparatus, comprising:

a radially interior inlet downcomer panel which defines an inlet opening of a downcomer vapor-liquid flow through passageway;

a step platform extending radially outward with respect to said inlet downcomer panel at an intermediate level of the downcomer vapor-liquid flow through passageway;

a step wall extending below said step platform and having outer ends spaced apart along said inlet downcomer panel;

first and second extensions with the first extension extending out away from a first of said outer ends toward the vessel wall and a second extension extending out away from a second of said outer ends toward the vessel wall so as to define along lower edges of said first and second extensions, which lower edges are positioned above an underlying tray, liquid flow-through passageways with respect to the underlying tray, and at least one of said step wall and said first and second extensions comprising baffles which are positioned in the horizontal flow passageway formed between lower edging of said step wall and first and second extensions which influence fluid flow traveling between said lower edging and the underlying tray.

54. The step apparatus of claim 53 wherein said baffles include a series of planar panels that extend out away from said step wall.

55. The step apparatus as recited in claim 1 wherein said first and second extensions have a vertical length sufficient to have the first and second lower edges act as directional and momentum flow controllers relative to a below positioned tray to direct the momentum and direction of downcomer exit fluid flow traveling under said lower edges from an inlet side of the downcomer apparatus, through the liquid flow-through passageways and to an active area of the underlying tray.

56. The apparatus of claim 31 wherein said flow through regions feature lower edging in said downcomer panel which is vertically spaced relative to the below positioned vapor-liquid contact tray as to control direction and momentum of horizontal fluid flow traveling through said flow from an infeed area to an active area of the lower tray.

57. The method of claim 33 wherein gas is bubbled through an active portion of the lower tray which is radial out from a vertical plane extension down from an inlet edge of the downcomer.

58. The assembly as recited in claim 38 wherein there are provided direction flow baffles in a lower edge of at least one of said step wall and extensions.

* * * * *

UNITED STATES PATENT AND TRADEMARK OFFICE
CERTIFICATE OF CORRECTION

PATENT NO. : 6,575,438 B2 Page 1 of 1
DATED : June 10, 2003
INVENTOR(S) : Dale E. Nutter et al.

It is certified that error appears in the above-identified patent and that said Letters Patent is hereby corrected as shown below:

<u>Column 19,</u>
Line 43, please delete "30%" and replace it with -- 30° --.

Signed and Sealed this

Twenty-first Day of October, 2003

JAMES E. ROGAN
*Director of the United States Patent and Trademark Office*